Figure 6:
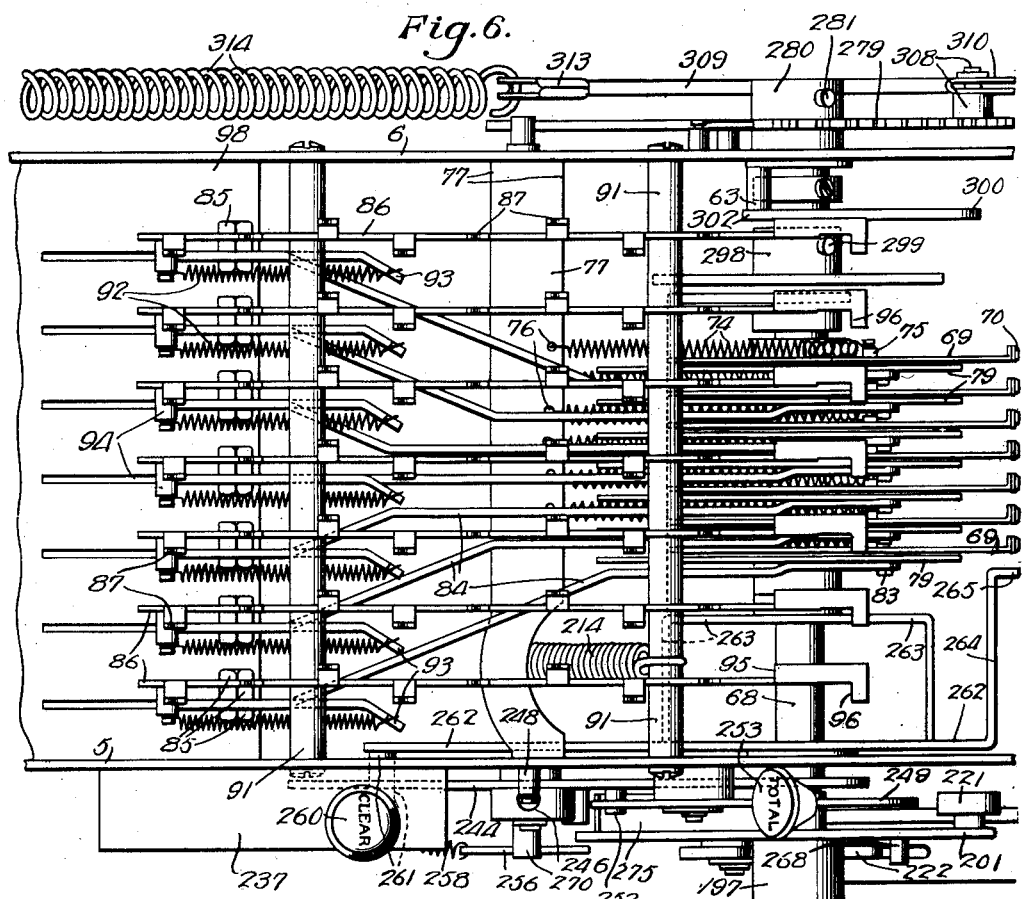

June 30, 1931.  G. J. BARRETT  1,812,129
CALCULATING MECHANISM FOR ADDING AND LISTING MACHINES
Filed Oct. 7, 1927   8 Sheets-Sheet 1
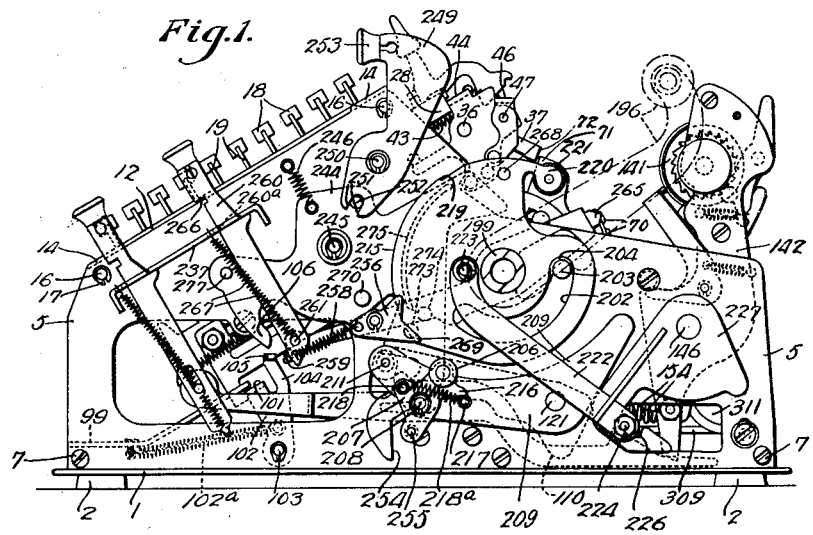
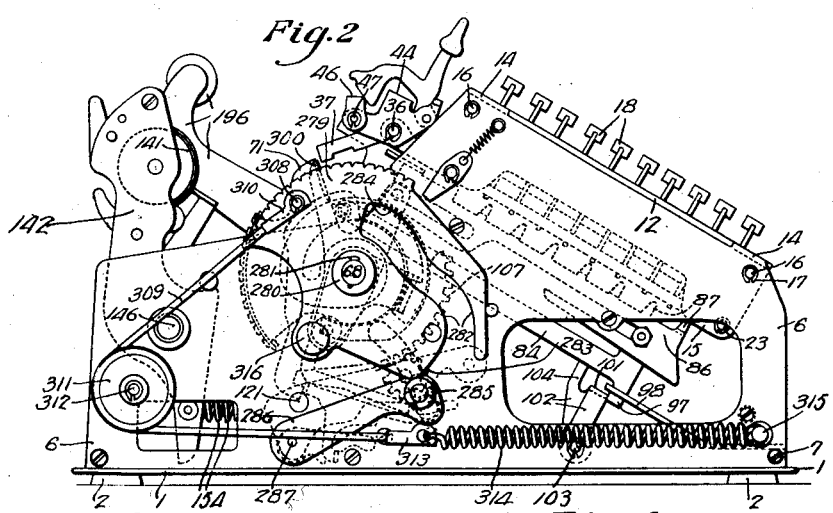
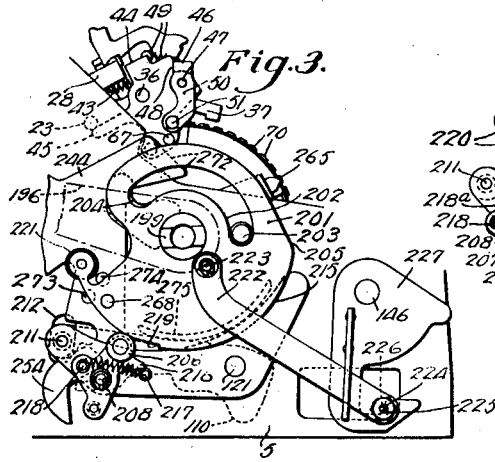
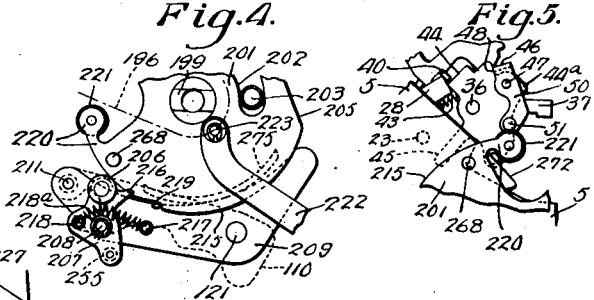
INVENTOR
Glenn J. Barrett
BY
ATTORNEYS INVENTOR
Glenn J. Barrett
BY
ATTORNEYS INVENTOR
Glenn J. Barrett
BY
ATTORNEYS

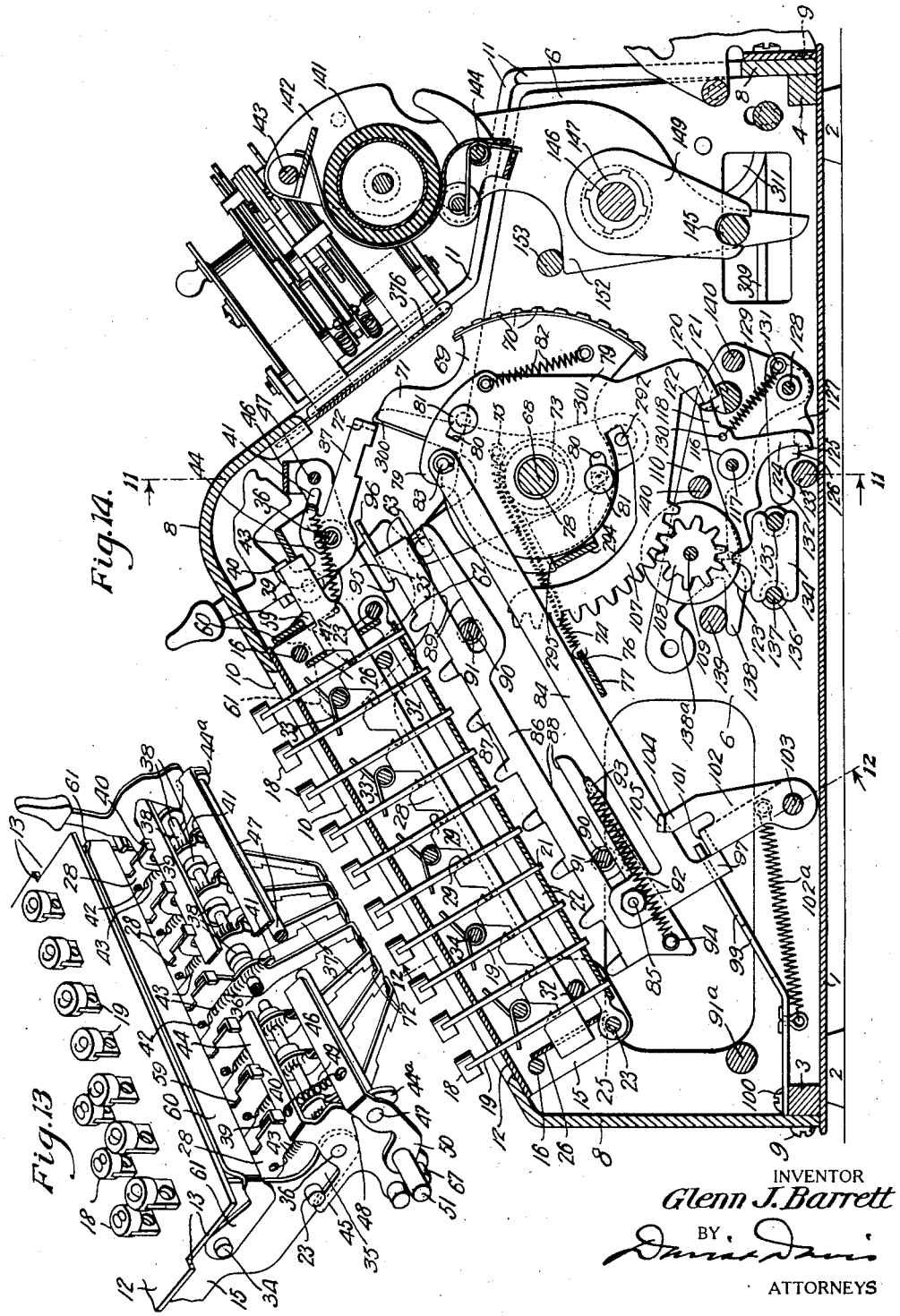

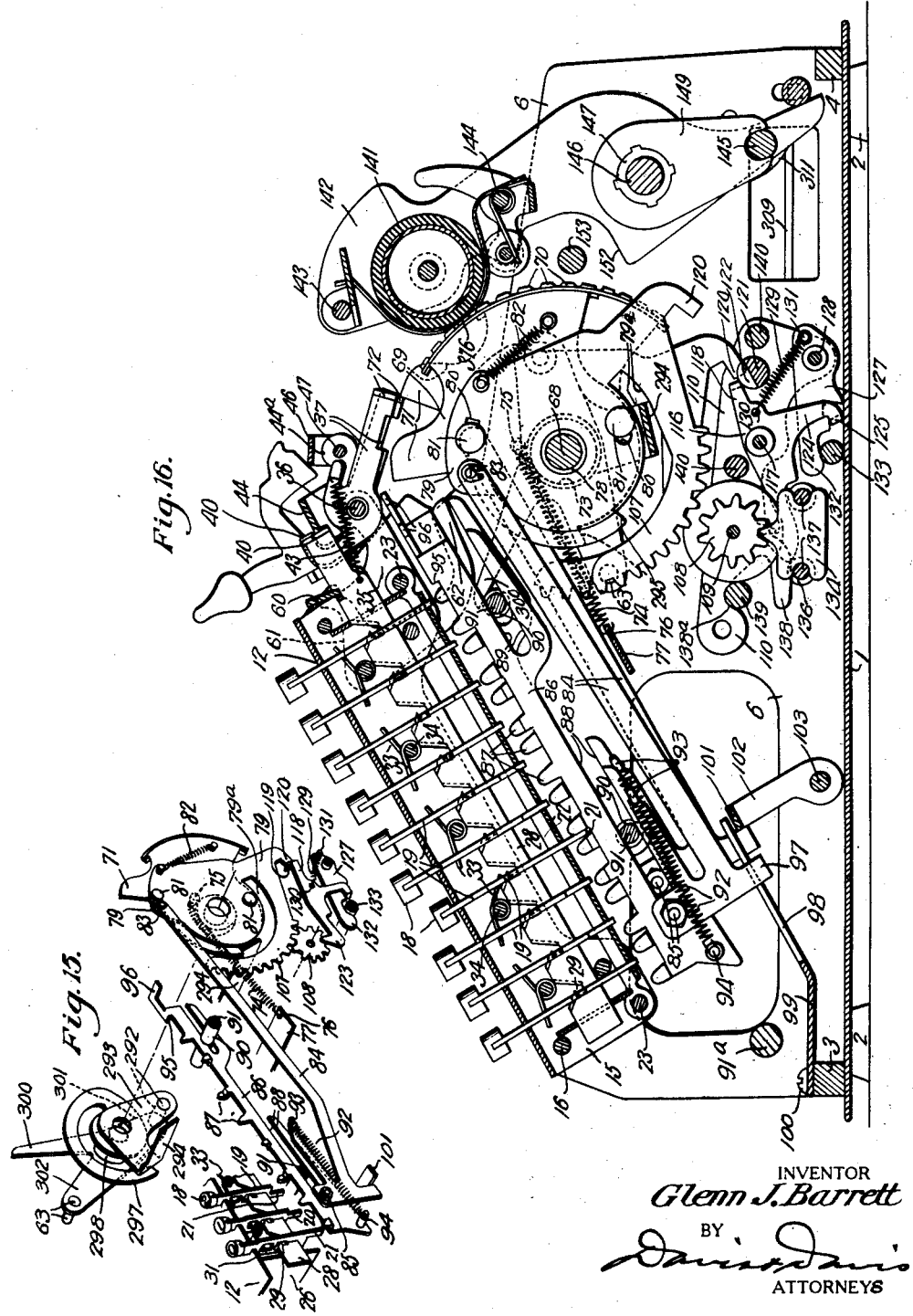

June 30, 1931.   G. J. BARRETT   1,812,129
CALCULATING MECHANISM FOR ADDING AND LISTING MACHINES
Filed Oct. 7, 1927   8 Sheets-Sheet 6
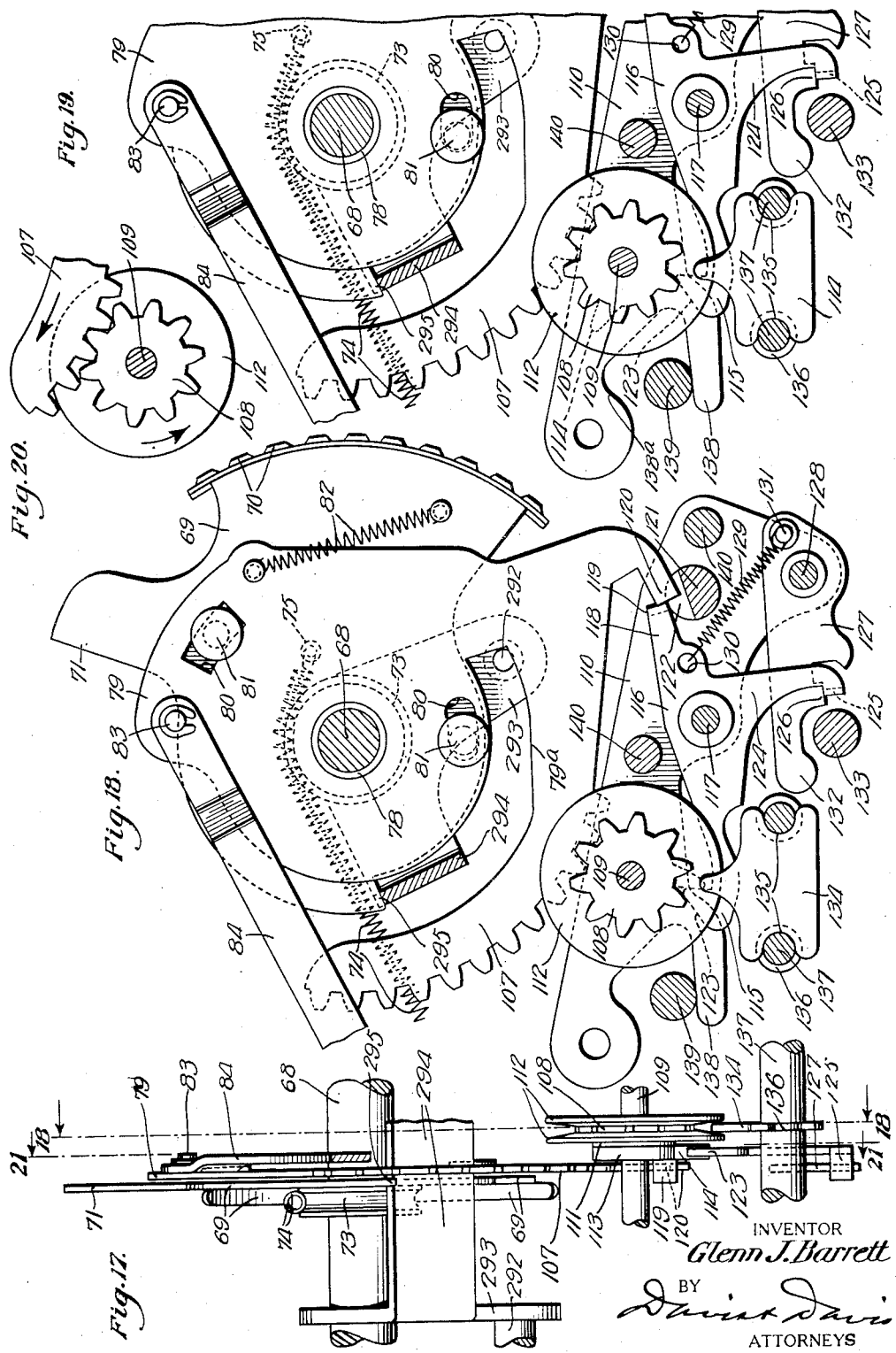
INVENTOR
*Glenn J. Barrett*
BY
*David Davis*
ATTORNEYS

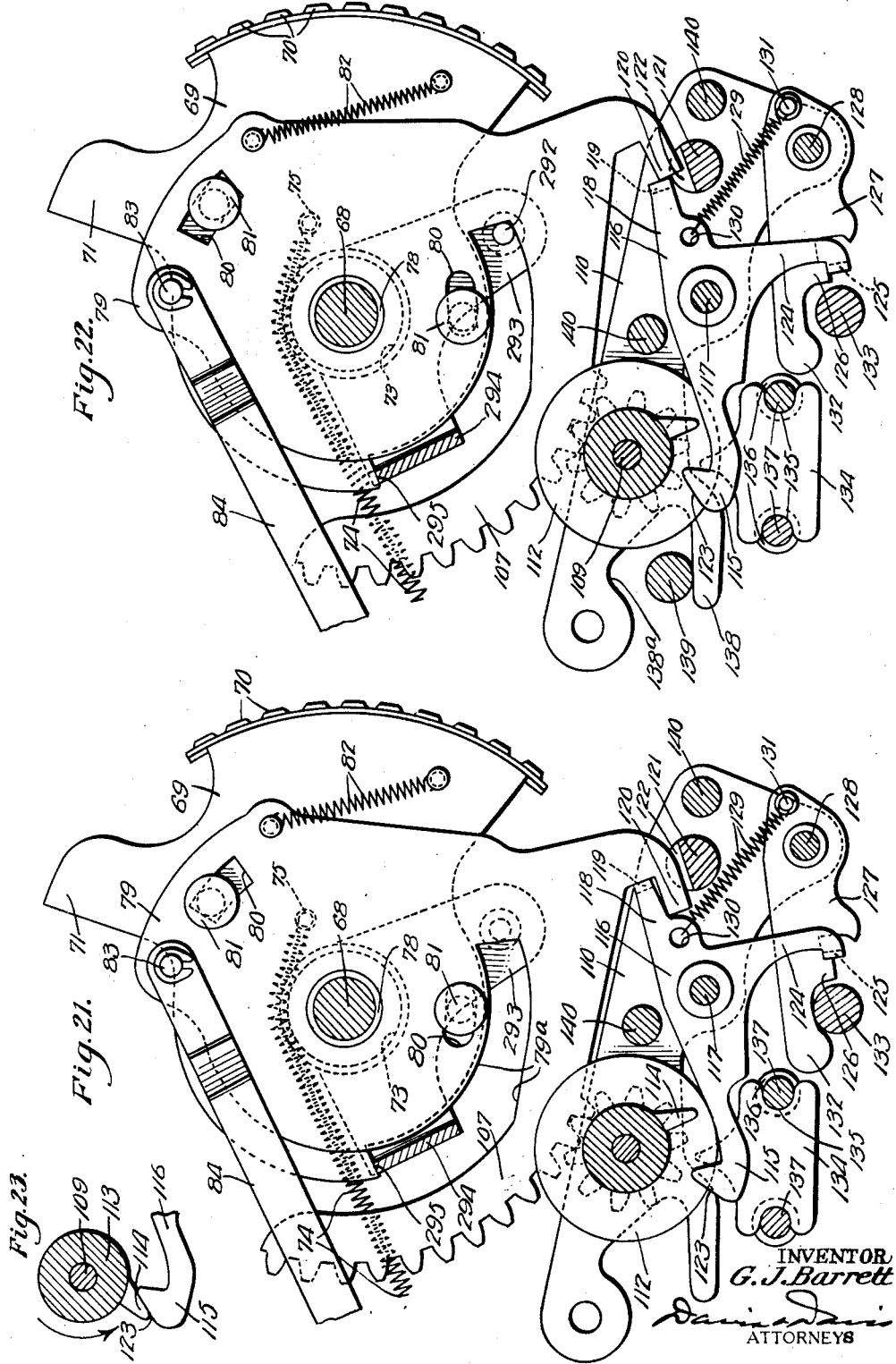

June 30, 1931. G. J. BARRETT 1,812,129
CALCULATING MECHANISM FOR ADDING AND LISTING MACHINES
Filed Oct. 7, 1927 8 Sheets-Sheet 8
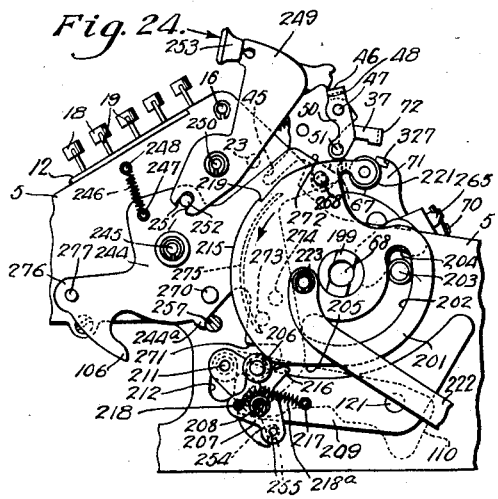
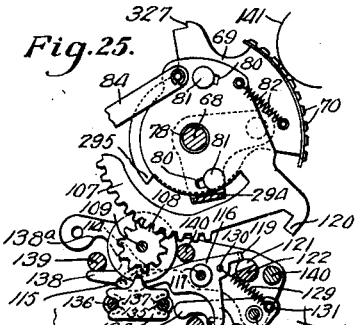
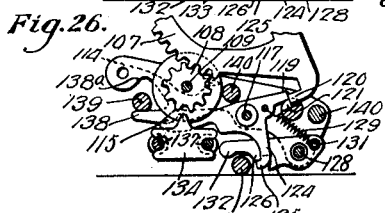
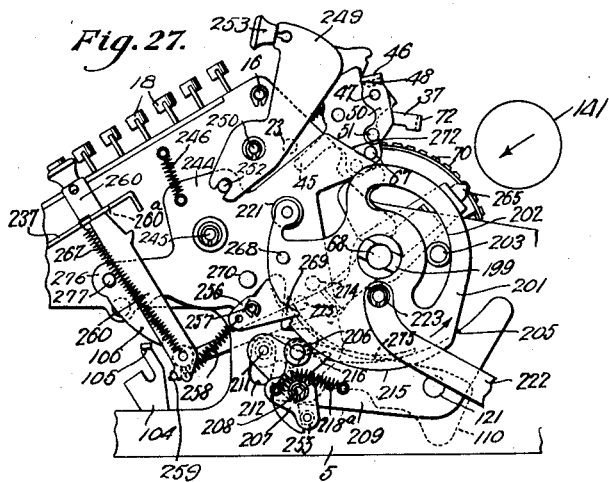
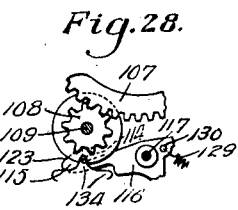
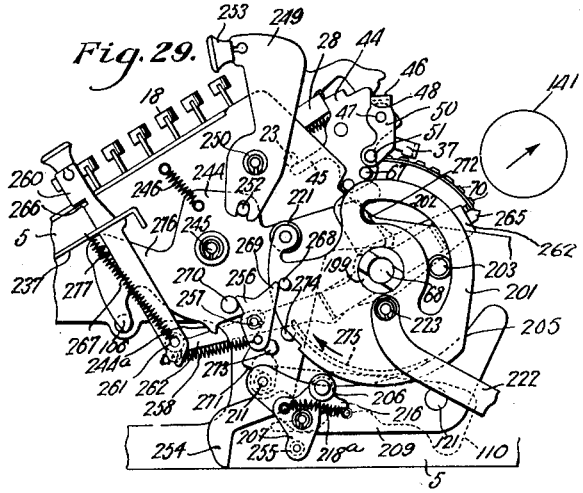
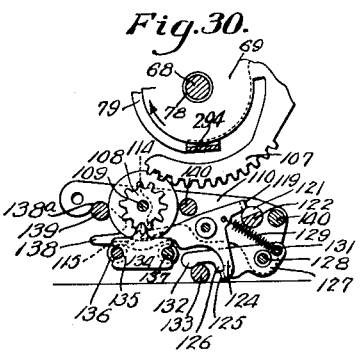
INVENTOR
Glenn J. Barrett
BY
ATTORNEYS Patented June 30, 1931

1,812,129

UNITED STATES PATENT OFFICE

GLENN J. BARRETT, OF EVANSTON, ILLINOIS, ASSIGNOR TO PORTABLE ADDING MACHINE COMPANY, OF CHICAGO, ILLINOIS, A CORPORATION OF ILLINOIS

CALCULATING MECHANISM FOR ADDING AND LISTING MACHINES

Original application filed August 14, 1925, Serial No. 50,219. Divided and this application filed October 7, 1927. Serial No. 224,616.

One object of the invention is to provide a simple and efficient calculating mechanism for key-set adding and listing machines.

Other objects of the invention are to provide a simple and compact calculating mechanism especially suitable for use in a small portable adding and listing machine; to provide a calculating mechanism wherein the transfer of tens from one decimal order unit to the next higher decimal order unit of the accumulator in adding is effected in an efficient manner by very simple means; to simplify the machine by providing accumulator-wheel-driving means consisting largely of parts of the listing mechanism; to provide accumulator-wheel-driving sectors and type segments for driving the sectors mounted for limited relative movement therebetween about a common axis in one direction for printing of ciphers and in the opposite direction for transfer of tens from wheel to wheel of the accumulator and connected together by tension springs for effecting such relative movements; to provide simple and efficient means for both differentially driving the accumulator-wheel-driving sectors in one direction in accordance with the setting of the numeral keys of the keyboard and restoring the same to normal position through the medium of the type segments; to mount the accumulator wheels and the transfer controlling means to shift as a unit during movements of the wheels into and out of mesh with the adding sectors; to simplify the construction by mounting on the main shaft of the machine the adding sectors, type segments, and a control bail therefor all for oscillatory movement about said shaft, and providing means for driving the bail from the shaft in timed relation to oscillatory movements of the shaft; to provide a restoring bail adapted to restore the active adding units on the return stroke of the handle for driving the accumulator wheels during adding operations, and to reset to normal position at the end of the forward stroke of the handle idle adding sectors that have moved to tens-transfer position during a previous adding operation, to thereby permit restoration of the transfer control devices to normal position before the next adding action of the adding sectors on the accumulator wheels takes place; to provide means for insuring full throw of the control bail for the adding and printing sectors; to provide simple key-released means for each decimal order row of keys for preventing driving of the adding units; and to provide automatic locking means for preventing restoration of said key-released means to normal position during the forward stroke of the handle.

To the foregoing and other ends, which will hereinafter appear, the invention consists in the features of construction, arrangements of elements, and combinations of parts specified in the appended claims.

The improvements in preferred form have been illustrated in connection with a portable key-set adding and listing machine more fully shown and described in my co-pending application, Serial No. 50,219, filed August 14, 1925, of which application the present application is a division. Only so much of the machine shown and described in said copending application as is necessary for a full understanding of the improvements claimed in the present application is shown and described herein.

Figures 7, 8:
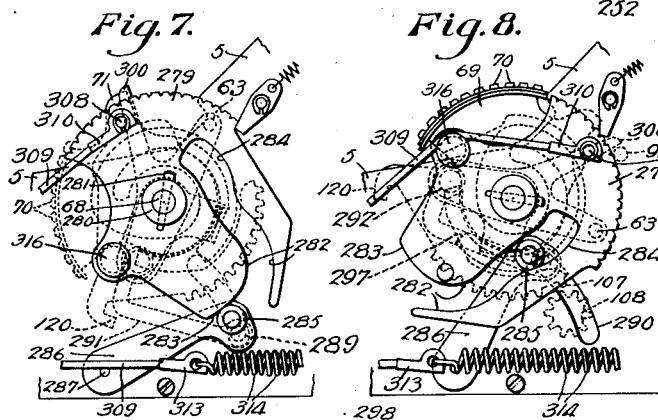
Figure 9:
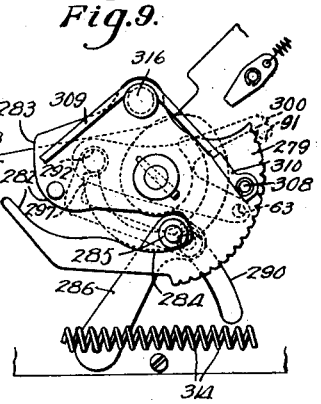
Figure 10:
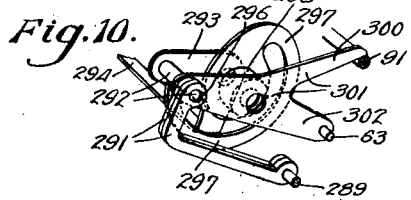
Figure 11:
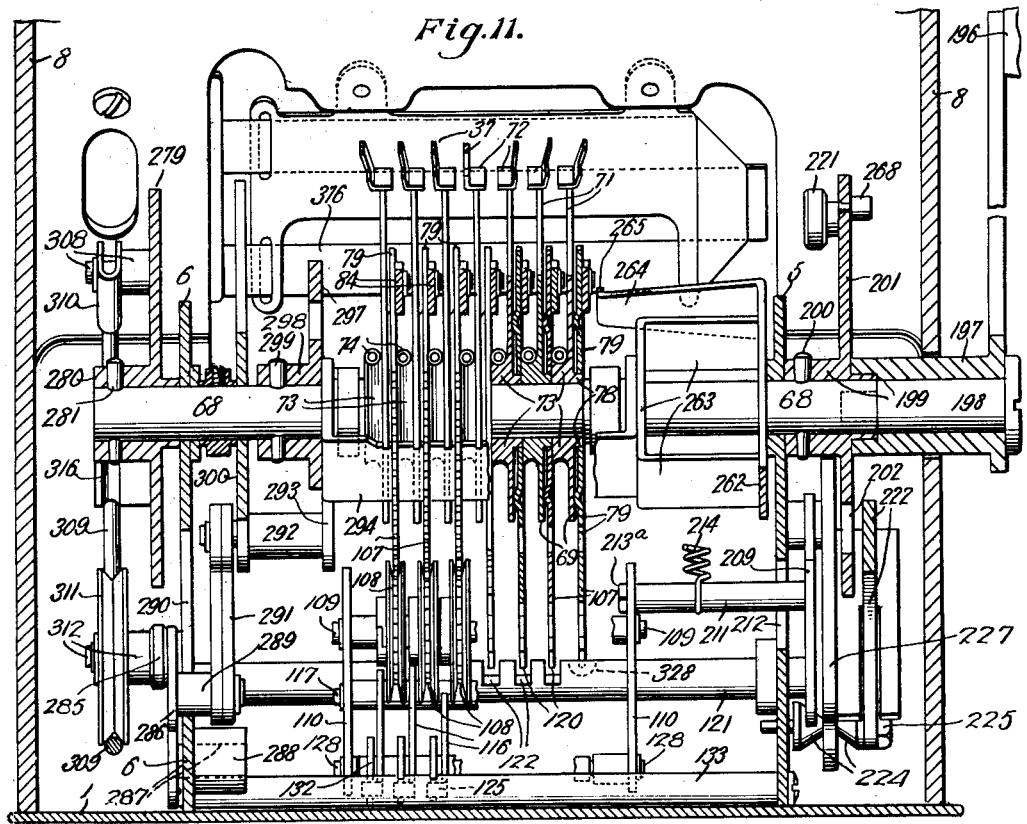
Figure 12:
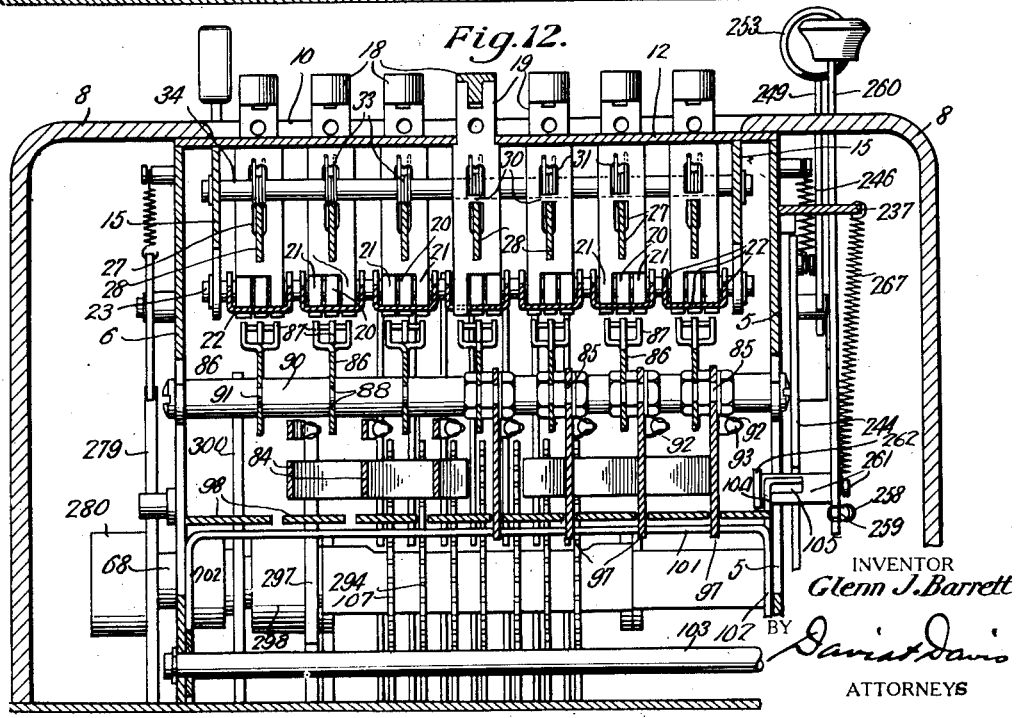

In the appended drawings:

Fig. 1 is a side elevation of the machine, with the outer casing removed, as viewed from the right hand side of the machine, the working parts standing in normal idle position;

Fig. 2 a side elevation of the machine, with the outer casing removed, as viewed from the left hand side of the machine, the working parts standing in normal idle position and certain of the parts being omitted;

Fig. 3 a fragmentary side elevation showing the control mechanism at the right hand side of the machine, the working parts being positioned as at the end of the forward stroke of the general operating handle;

Fig. 4 a fragmentary side elevation showing the roller-carrying trip lever tripped by the cam disk at the right hand side of the machine as the operating handle has moved slightly backward on its return stroke;

Fig. 5 a fragmentary side elevation of the control mechanism at the right hand side of the machine illustrating the numeral key releasing operation;

Fig. 6 a top plan view of a portion of the machine with the keyboard unit removed;

Fig. 7 a fragmentary view showing the restoring bail operating means as viewed from the left hand side of the machine, the working parts being shown as positioned when the operating handle has moved slightly on its forward stroke;

Fig. 8 a view similar to Fig. 7, the working parts being shown as positioned when the operating handle has moved through about half of its forward stroke;

Fig. 9 a view similar to Fig. 7, the working parts being shown as positioned at the end of the forward stroke of the operating handle;

Fig. 10 a perspective view showing details of the restoring bail operating means;

Fig. 11 a transverse vertical sectional view on the line 11—11 of Fig. 14, substantially in the plane of the main shaft, parts of the mechanism being shown in front elevation;

Fig. 12 a transverse sectional view approximately on the line 12—12 of Fig. 14, substantially at a right angle to the plane of the keyboard, a part of the section being offset to bring out certain details of construction;

Fig. 13 a perspective view of the rear portion of the keyboard unit;

Fig. 14 a vertical longitudinal sectional view substantially through the center of the machine, the working parts being in normal idle position;

Fig. 15 a perspective view showing a single accumulator-driving or adding unit and associated devices;

Fig. 16 a vertical longitudinal sectional view of the machine, with the working parts positioned as at the end of the forward stroke of the handle, and with the outer casing removed;

Fig. 17 a front elevation of an accumulator unit and an adjacent accumulator driving unit;

Fig. 18 a detail view on the line 18—18 of Fig. 17, with the accumulator wheel at zero;

Fig. 19 a view similar to Fig. 18 after a number has been added;

Fig. 20 a detail view showing an adding sector rack driving an accumulator wheel during an adding operation;

Fig. 21 a view on the line 21—21 of Fig. 17, showing the parts in tens-transfer position;

Fig. 22 a view similar to Fig. 21, showing the transfer control devices reset;

Fig. 23 a detail view showing the transfer trigger of an accumulator wheel in position to operate the transfer pawl of the next higher decimal order adding unit as the wheel turns in adding direction from the ninth to the tenth unit space in adding direction;

Fig. 24 a fragmentary side elevation of the machine as viewed from the right, with the outer casing removed, showing the parts as positioned when the total key has been actuated and the operating handle has started on its forward stroke;

Fig. 25 a fragmentary sectional view showing the adding sectors and accumulator wheels as positioned at the end of the forward stroke of the handle in taking a total;

Fig. 26 a fragmentary sectional view showing the adding sectors and accumulator wheels as positioned at the beginning of the forward stroke of the handle in taking a total;

Fig. 27 a fragmentary side elevation of the machine as viewed from the right, with the outer casing removed, showing the parts as positioned when the total key and the clearing key have both been set and the operating handle has partly completed its forward stroke;

Fig. 28 a fragmentary sectional view showing an adding sector rack and an accumulator wheel positioned as at the end of the forward stroke of the handle during a total taking and clearing operation;

Fig. 29 a fragmentary side elevation of the machine as viewed from the right, with the outer casing removed, showing the positions of the working parts during a total taking and clearing operation after the handle has started back on its return stroke; and Fig. 30 a fragmentary sectional view showing the positions of the adding sectors and accumulator shortly after the handle has started on its return stroke during a total taking and clearing operation.

This machine is provided with a base plate 1, to which rubber feet 2 are preferably secured. This base plate is provided with two transversely extending rectangular bars 3 and 4, near the front and rear ends of the machine, and two main frame side plates 5 and 6 are secured to the ends of the bars 3 and 4 by screws 7, the frame plate 5 being on the right hand side of the machine and the frame plate 6 on the left hand side. The frame plates 5 and 6 are adapted to support the entire mechanism of the machine, except the ribbon mechanism which, as hereinafter explained, is secured to the cover casing 8. The casing 8 is adapted to enclose most of the working parts of the machine and is held in place by screws 9, entering the transverse bars 3 and 4. The side plates 5 and 6 support certain transverse rods and shafts hereinafter referred to. The upper edges of the side plates incline upwardly and rearwardly from their front ends and then extend downwardly and rearwardly to the rear ends.

The side walls of the cover or casing 8 follow generally the outline of the side plates 5 and 6, and the front portion of the top wall of the cover extends upwardly and rearwardly from the front vertical wall of the cover, while the rear portion of the top wall extends downwardly and rearwardly to the vertical rear wall of the cover. The rear portion of the top wall of the cover supports the ribbon mechanism and ribbon guide in position for the ribbon to cooperate between the platen and type segments. The front part of the top wall of casing 8 is provided with a rectangular opening at 10 to expose the keyboard, and an opening 11 in the rear part of the top wall is adapted to provide for the movement of the platen and its rocking frame and the passage of the paper from the paper roll to the platen. The cover casing 8 is also provided with suitable openings for the various special keys, such as total, clearing, and non-print. The key caps of the special keys are preferably detachable, so that when they are removed the cover casing can be readily removed by simply taking out the screws 9 which secure the casing to transverse bars 3 and 4.

Keyboard section

The upwardly and rearwardly inclined keyboard section attached to the front upwardly inclined portions of the side frame plates 5 and 6 comprises a top plate 12, the lateral edges of which are provided with dove-tail notches 13 adapted to cooperate with dovetail lugs 14 on the respective frame side plates 5 and 6. This dovetail mounting not only helps hold the keyboard unit in place but is adapted to position it in the machine in proper relation for the parts to cooperate with the adding unit and control mechanism. The top plate 12 of the keyboard unit is riveted or otherwise secured to side plates 15, which extend downward from the underside thereof, and are adapted for the support of various associated parts of the keyboard unit. Removable rods 16, extending transversely through the frame side plates 5 and 6 and the side plates 15 of the keyboard unit, are adapted to secure the keyboard unit in place on the side plates of the machine. The rods 16, as well as other similar transverse rods, are preferably held in place in the frame by sealing clips 17 forced into annular grooves in the ends of the rods.

The keyboard comprises a plurality of fore-and-aft extending rows of numeral keys 18 having values "0" to "9", inclusive, from front to rear and secured to the upper ends of key stems 19 which pass through suitable transverse slots in the top plate 12 of the keyboard unit. The keys 18 are made smaller in diameter than in standard machines, so as to facilitate mounting the rows of keys, and the keys in each row, closer together to thereby provide a condensed keyboard without interfering with the ease of fingering. The key stems 19 are preferably punched from sheet metal in two forms, one with a central tail or stop finger 20 and the other with a tail or stop finger 21, located at one edge, so that by reversing the latter type of key stems 19 the tails or stops 20—21 in each row of keys will be in three parallel lines. The lower tail ends of the keys 19 are supported in bridge strips 22, which are provided with three lines of perforations for the passage therethrough of the key stop fingers 20 and 21. The bridge plates 22, which are U-shaped in cross section, are supported from the side plates 15 of the keyboard unit by transversely extending rods 23 passing through holes in the side plates and through holes in ears at the ends of the respective bridge plates. The bridge plates 22 are held in proper spaced positions transversely of the keyboard unit, by notches 25 in transversely extending comb or guide plates 26 mounted respectively between the front and rear ends of the side plates 15 and supported therein.

The key stems 19 are provided with elongated openings at 27, through which key latch strips 28 extend, the latch strips being provided with latch dogs 29, cooperating with detents 30 formed on the key stems 19 between openings 27 and openings 31 above the openings 27. The latch strips 28 are properly spaced transversely of the keyboard unit by slidably mounting the ends thereof in slotted holes in the guide plates 26. The latch dogs 29 are beveled on their upper edges and provided with undercut notches adapted to receive the detents 30 when the keys are depressed. When a key is depressed the latch strip will be moved toward the front of the machine until the upper side of the detent 30 can pass under the latch dog 29, whereupon the latch strip will return part way to its normal position until the front of the detent is engaged by the closed end of the notch in the latch dog. In this manner the key is held in depressed or set position, but, if after a key is depressed another key is depressed in the same row, the first key will be released and returned by its spring 33 to normal position, thus forming a "flexible key-board".

The undercut notches of the beveled latch dogs 29 are of shallow depth fore-and-aft so that, when the detents 30 of the key stems are engaged in the notches, the latch strips 28 will not return fully to their original positions, but will be held slightly forwardly advanced, to thereby hold the associated stop levers 37 hereinafter referred to out of engagement with the corresponding adding units.

The side plates 15 of the keyboard unit are secured together near their lower edges by two stay rods 32, which are riveted in place and located below the latch strips 28 in position to support the latter and permit free sliding movement thereof. In order to restore depressed keys to normal position when unlocked, springs 33 are provided. These springs are coiled about rods 34, extending transversely of the rows of keys, between alternate key stems of the rows, and the ends of the springs extend in opposite directions and are adapted to pass through the holes 31 in adjacent key stems 19. In this manner a single spring is adapted to operate two keys.

The side plates 15 of the keyboard unit are provided with rearwardly projecting arms 35 forming the support for a transversely extending shaft 36 lying below the rear ends of the latch strips 28 for supporting a plurality of stop levers 37 pivotally mounted thereon. The stop levers 37 are carried on hubs 38 which form spacing elements therebetween on the shaft 36 and maintain the upper ends 39 of the levers in the same spaced relation as the latch strips 28 with which they cooperate. The upper ends 39 of the stop levers 37 lie alongside the rear ends of the latch strips 28 and are provided with laterally projecting ears 40 which engage with the ends of the latch strips. The stop levers 37 are also provided with rearwardly projecting fingers 41 between which and holes 42 in the respective latch strips 28 double-acting springs 43 are connected for holding the ears 40 in contact with the ends of the respective latch strips and for moving the latch strips toward the rear to effect latching of set keys or, when no keys are set, the springs will hold the latch strips 28 and stop levers 37 in normal position with the latter in position to engage the stops or detents 71 of the type segments which drive the adding sectors, as hereinafter described.

The transversely extending rod or shaft 36, supporting the stop levers 37, forms the pivotal support for a bail 44 adapted to lie immediately back of the rear ends of the latch strips 28 and to limit the rearward movement of the latter under the action of their springs 43. The position of the bail 44 is determined by a forwardly extending arm 45 engaging the end of one of the bridge rods 23, see Fig. 13, thereby limiting the rearward movement of the bail 44 and of the latch strips 28 under the pressure of the springs 43.

The bail 44 is provided with rearwardly extending arms 44ᵃ for pivotally supporting thereon a small auxiliary bail 46, pivoted on a shaft 47. The auxiliary bail 46 is normally held against a shoulder 48 on the right side of the bail 44, as shown in Figs. 13 and 29, of the drawings, by a spring 49 extending between the two bails, and the right end of the auxiliary bail 46 is provided with a depending arm 50 carrying a laterally extending pin 51 adapted to be engaged by a roller hereinafter referred to in connection with the handle mechanism, for operating the bail 44 to move all of the latch strips forward and thereby release any set keys at the end of the return stroke of the general operating handle 196.

During the operating of the machine, adding unit stop slides, hereinafter referred to, are adapted to engage the lower extremities or tail stops of the set keys and the impact, particularly during the repeat operation, is apt to jar the depressed keys so that there is a possibility of jarring the latch strips loose and permitting release of the keys. In order to prevent accidental release under these circumstances, the latch strips 28 are preferably provided with notches 59, near their rear ends, with which a locking bail 60 is adapted to cooperate for preventing movement of the latch strips, after the handle has been started on its forward stroke. The locking bail 60 is pivotally mounted by arms 61, see Figs. 13 and 14, on the ends of the rearmost key spring supporting rod 34 mounted in the side plates 15 of the keyboard unit, as will be seen in Fig. 13 of the drawings. The locking bail 60 is preferably provided with a downwardly and rearwardly extending arm 62, adapted to cooperate with a pin 63, carried on a lever arm hereinafter referred to in describing the control mechanism operated by the handle. The arrangement, as will be seen in Figs. 13 and 14, is such that, in normal position of the handle, the pin 63, by engaging the lower end of the arm 62, lifts and holds the locking bail 60 out of engagement with the notches 59 in the latch strips 28, thereby permitting keys to be freely set. However, after the handle has started and is on its forward stroke, the pin 63 will be moved out of engagement with the arm 62, thus permitting the locking bail 60 to engage the notches of the latch strips and prevent accidental movement thereof.

*Accumulator driving units*

The accumulator driving or adding units are rotatably mounted upon the main shaft 68, to which the handle 196 is secured as hereinafter described, and include driver elements 69, in the form of type segments carrying types 70, and adding sectors 79 driven from the type segments. The numeral types 70 are formed on narrow rolled type strips, concentrically mounted on arcuate flanges on the rear edges of driver elements or type segments 69, the types being fixed thereon in order from "0" to "9" from top to bottom and adapted to be printed from by movement of the platen against the type segments, as hereinafter described. The type segments or driver elements 69 of the accumulator driving units are provided with upwardly projecting stop lugs 71 normally engaged behind ears 72 bent laterally from the rear ends of the stop levers 37 to hold the "0" types one space below the printing line of the machine. The arrangement is such that when the keys are set the ears 72 are lifted sufficiently to clear the ends of the stop lugs 71, thereby permitting rotation of the accumulator driving units in counter-clockwise direction as viewed from the right when the handle 196 is rocked forward. The type segments and adding sectors are preferably mounted in condensed form, that is so that the spacing of the segments corresponds to the spacing of the digits of the printed numbers and, since the decimal order rows of keys 18 are spaced farther apart than is required for the type segments, the rear ends of the stop levers 37 are bent inward as indicated to bring the ears 72 thereof into cooperative relation with the accumulator driving unit stop lugs 71. The driver element type segments 69 are secured to hubs 73 which are formed with pulley grooves, for driving springs 74 which pass over the hubs and are attached to pins 75 secured to the respective driving elements 69. The opposite ends of the springs 74 are carried forward and anchored in holes 76 in a cross-bar 77 extending between the side plates 5 and 6 and supported thereby. It will be seen that by this arrangement that the driving elements 69 of the adding or accumulator driving units are urged in counter-clockwise direction as viewed from the right by the action of the springs 74, but are normally prevented from such movement by stop levers 37 and a restoring bail 294 hereinafter described. The desired driving elements 69 may be freed for such movement upon rearward swinging of bail 294 by the depression of the keys in the keyboard which would lift the stop levers 37 associated with key rows in which keys are depressed.

The hubs 73 of the driving elements 69 extend a short distance on the right hand side of the latter to form bearing bosses 78 upon which adding sectors 79 are rotatably mounted. The adding sectors are preferably spaced slightly from their associated driver-type segments 69 by annular beads, and are provided with elongated slotted holes 80 through which headed rivets 81 on the segments or driving elements extend, thereby securing the adding sectors to the respective driving elements for independent rotation to the extent of one unit. The driving elements 69 and the adding sectors 79 are resiliently connected together by springs 82, the arrangement being such that the springs 82 are adapted to move the adding sectors in one direction for transfer of the tens or the segments in the opposite direction to position "0" type at the printing line, as more fully described hereinafter.

The movements of the adding or accumulator driving units, after the stop levers 37 have been lifted by setting keys representing the number to be added, are adapted to be determined by the tail stops of the set numeral keys. For this purpose the adding sectors 79 are provided with pivot studs 83 to which links 84 are pivotally connected, the opposite ends of the links 84 being connected by bolts 85 with stop slides 86 each of which is provided with eight stop ears or lugs 87 and two stop shoulders 95 and 96 adapted to engage the tail stops 20—21 of the keys 19. It has been previously pointed out that the accumulator driving units are mounted in condensed form, corresponding to the spacing required between the type segments and, therefore, the links 84 are bent or fan outwardly from their connection to adding sectors at their rear ends to their connections with the stop slides 86 which correspond with the spacing between rows of keys. The stop slides 86 are provided with elongated slots at 88 and 89 cooperating with annular grooves 90 in transversely extending rods 91 supported in the frame plates 5 and 6, the arrangement being such that the stop slides 86 are held in proper spaced relation and are freely slidable for differential positioning of the respective adding units according to a number set up on the keyboard. A transverse rod 91ᵃ is supported in the frame plates 5 and 6 forwardly of the forward ends of the links 84. This rod 91ᵃ serves as an abutment for the links and prevents their being accidentally moved forward far enough to disengage the slots 89 from the rod 91.

An important feature of my improvement in association with the link connections 84 and the stop slide strips 86, is to provide for independent resilient movement between these elements. This is accomplished by slidably mounting the pins or bolts 85 of the connecting links 84 in the forward ends of the slots 88 of the respective stop slides 86, so as to permit relative longitudinal movement therebetween. The pins or bolts 85 are held normally at the forward ends of the respective slots 88 by means of springs 92 connected to fingers 93 on the links 84, and to pins 94 in the forward ends of the respective stop slides 86. This arrangement provides a safety device to prevent injury to the machine in case a key is accidentally depressed during the return stroke of the handle 196. If a key is depressed before the full return of the stop slides, then one of the stop lugs 87 would engage the front side of a key tail stop 20—21 and thus prevent the return of the corresponding stop slide 86 with its associated adding sector 79 which, as hereinafter described, is adapted to be returned to normal position when the driving elements 69 are returned by the restoring bail 294, but this would merely stretch the spring 92 and as soon as the return of the handle releases the key the spring will snap the stop slide back to normal position.

It has been previously pointed out that, in order to condense the keyboard and at the same time provide for a greater movement of the stop slides 86 than the distance between the keys in a row, the tail stops of the keys are arranged in three parallel lines. This arrangement is of advantage in that it requires less accuracy in adjusting the relation between the parts. Accordingly the stop ears or lugs 87 on the stop slide strips are correspondingly arranged in three lines, in order to bring the stops into proper cooperative relation with the three lines of tail stops 20 and 21 of the keys. The two rearmost stops on the stop slides 86, instead of being formed as upwardly projecting lugs or ears as at 87, are preferably formed as shoulders 95 and 96 on a folded-over angle projection on the stop slides to permit a more compact arrangement between operating parts of the machine.

In order to guide and ensure movement thereof parallel with the stop slides 86 with which they are slidably connected, the forward ends of the links 84 are provided with depending lugs 97 engaging slots 98 in a comb plate 99 secured at the front of the machine to the base cross-bar 3 by suitable screws 100. The depending lugs 97 are adapted to cooperate with a universal bail 101, provided with rock arms 102 pivotally mounted upon a shaft 103 extending transversely of the machine near the bottom thereof and supported in the side frame plates 5 and 6. A spring 102ª connected to the comb plate 99 and to the right-hand rock arm 102 tends to hold the bail forward against the depending lugs 97. The right end of the universal bail 101 is provided with an upwardly projecting arm 104 provided with a laterally projecting ear 105 adapted to cooperate with a finger 106 formed as part of the totaling and clearing lever 244, as hereinafter more particularly described. The arrangement is such that if any of the links 84 and the associated adding sectors are out of normal position because of transfer of the tens, the universal bail 101 will be moved rearward by lugs 97, thereby placing the ear 105 in position to be engaged by the finger 106 to thereby prevent operation of the total key 253, as hereinafter described, until the adding sectors and links have been restored to normal position by an idle stroke of the handle 196. It will be seen that the stop slides 86 are mounted in the machine at an angle to the horizontal, so as to slide in parallel relation to the under side of the keyboard unit, the stop lugs 87 being adapted to clear the tails or stop ends of the keys when the keys are in normal retracted position.

Accumulator unit

The adding sectors 79, which are adapted to cooperate with the pinion elements 108 of the accumulator or register wheels, are provided with segmental gear racks 107 formed concentrically with the main shaft 68 and normally in mesh with the teeth of the register wheel pinions 108 rotatably mounted on a transverse rod or shaft 109, the ends of which are supported in the side bars 110 of the accumulator unit rocking frame. The accumulator or register wheels comprise hubs 111 upon which the pinions 108 are mounted, the pinions being flanked on each side by outwardly flaring cupped disks 112 which are adapted to maintain registration between the thin sheet metal adding sector racks 107 and the respective register wheel pinions 108. On the left hand side faces of the hubs 111 there are preferably mounted rings 113, carrying single teeth 114 forming the triggers for operating the carrying pawls in the transfer of the tens. The triggers 114 are preferably slanting on one face and straight on the other and adapted to cooperate with ratchet toothlike noses 115 at the forward ends of carrying levers 116, which in my improvement are pivotally mounted on a transverse shaft 117 supported in the side bars 110 of the accumulator unit rocking frame, and therefore are movable bodily with the register wheels when the latter are moved out of and into engagement with the adding sector racks 107 by the control mechanism hereinafter described. The rear ends 118 of the carrying levers are preferably provided with laterally extending ears 119 adapted to cooperate with forwardly projecting detent fingers 120 formed on the lower extremities of the respective adding sectors to control the transfer of the tens and normally adapted to arrest the return movement of the adding sectors shortly before the bail 294 completes the return movement of the type segments to tension transfer springs 82 and effect one space relative movement between the type segments and adding sectors which carries the zero types one space below the printing line. The accumulator unit rocking frame is mounted on a transversely extending rock shaft 121, the ends of which are journalled in the main frame side plates 5 and 6. The accumulator unit is adapted to be rocked with the shaft 121, as hereinafter described, for moving the register wheel pinions 108 into and out of mesh with the adding sector racks 107. Preferably the rock shaft 121 is provided with a plurality of notches 122 extending transversely of the axis of the shaft, into which the respective detent fingers 120 of the adding sectors are adapted to project for cooperation with the ears 119 on the carrying levers. It will be seen that by this construction that the engagement between the carrying-lever ears 119 and the detent fingers 120 are brought close to the axis of rotation of the accumulator unit, so that the slight rocking motion thereof, in moving the register wheels into and out of cooperative relation with the adding sectors, will not materially affect the relation between the carrying lever ears 119 and the detent fingers 120 of the adding sectors.

The noses 115 of the carrying levers 116 are provided with cam bevel faces 123 for cooperation with the triggers 114 of the register wheels as the register wheel pinions 108 are rotated during normal addition. Opposite the cam faces the tooth-like noses 115 of the carrying levers are straight,—that is substantially radial as to the register wheels, to form detent latches for engaging correspondingly radial faces on the triggers 114 when the register wheels are rotated in the opposite direction to reset the accumulator to zero or take the total. It will be understood that when the register wheel pinions 108 are rotated more than nine (9) units in counter-clockwise direction as viewed from the right, on the return stroke of handle 196 during addition, the triggers 114 will engage the bevel faces 123 on the ends of the carrying levers 116 and move the latter, so that the opposite ends 118 thereof will be moved out of the field of the detent fingers 120 thereby permitting the respective adding sectors to move in clockwise direction as viewed from the right an additional unit spaced under the pull of the transfer springs 82 for the transfer of the tens. It will be apparent, however, that frequently the adding sectors, and hence the detent fingers, will not have returned to normal position at the time the carrying levers 116 are tripped by the triggers 114 and, therefore, means must be provided for holding the carrying levers 116 in tripped position until the transfer of the tens takes place. For this purpose the carrying levers 116 are provided with depending arms 124 formed with laterally projecting ears 125 which are adapted to cooperate with depending latch lugs 126 on latch pawls 127 pivotally mounted on a transverse shaft 128 supported in the side bars 110 of the accumulator rocking frame. Springs are required for restoring and resiliently holding the carrying levers 116 in position to be engaged by the triggers 114, and preferably for this purpose double-acting springs 129 are provided, which extend from holes 130 in the carrying levers 116 to pins 131 on the latch pawls 127, thereby also utilizing the springs for holding the latch pawls in engagement with the ears 125 when the carrying levers are displaced by the triggers.

After the transfer of the tens, which takes place at the end of a return stroke of the handle 196, it is necessary to reset the carrying levers 116 before the next return stroke of the handle, and this resetting is done during the forward stroke of the handle. As the accumulator rocking frame 110 is moved downward to disengage the register wheel pinions 108 from the adding sector racks 107, the forward ends 132 of the latch pawls 127 are adapted to engage a transversely disposed fixed rod 133 on the main frame to rock the latch pawls upward relatively to the accumulator rocking frame from the position shown in Fig. 21 to the position shown in Fig. 16 and thereby release the transfer levers 116 and permit them to return to normal position by the pull of the springs 129 as indicated in Fig. 16, provided the detent fingers 120 have been pushed back, as hereinafter described. When the register wheel pinions 108 are again moved into mesh with the adding sectors there will be no possibility of displacement of pinions by the carrying levers, for both move together with the rocking frame 110.

During the differential positioning movements of the adding sectors in accordance with the setting of the numeral keys, on the forward stroke of handle 196, the register wheel pinions 108 are moved out of mesh with the adding sector racks 107 and therefore the register wheels, being freely rotatable, are liable to become displaced. To obviate this, fixed detents 134 are preferably located below the register wheels for engaging between teeth of the register wheel pinions 108 when the latter are moved out of mesh with the adding sectors. The detents 134 are preferably punched out of thin sheet metal and provided with tooth-like noses adapted to project upward between the guide disks 112 of the register wheel pinions so as to properly align with and enter between teeth of the register wheel pinions 108. The bases of the detents 134 are preferably provided with semi-circular notches 135 at their front and rear ends the edges of which are adapted to engage in annular grooves 136 in two horizontally disposed rods 137 supported by and extending transversely between the main frame side plates 5 and 6, thereby providing means for securing and properly spacing the respective detents 134. In order to limit the vibrating or rocking movement of the accumulator rocking frame 110 when the register wheel pinions 108 are moved into and out of mesh with the racks 107 of the adding sectors, the side bars 110 of the rocking frame are provided with forked ends, the lower forwardly projecting fingers 138 of which are adapted to engage a fixed transverse rod 139 supported in the main frame side plates 5 and 6 to limit the movement of the pinions toward the adding sector racks, and the upper forwardly extending parts 138$^a$ of which are adapted to engage said rod 139 to limit the movement of the pinions and accumulator rocking frame downward when the register wheel pinions are withdrawn from the adding sectors. The side bars 110 of the accumulator rocking frame are preferably secured rigidly together by transverse stay rods 140, the ends of which are riveted to the respective side bars 110, but the transverse rods 109, 117 and 128, supporting respectively the register wheels, the carrying levers and the latch pawls, are removably secured in the rock frame by suitable sealing clips, such as the sealing clips 17 previously referred to.

Printing mechanism

It has been previously pointed out that the type 70 on the respective driving-element type segments 69 are faced radially outward toward the rear and are adapted to be printed on by a suitable platen which is moved toward and from the type segments. For this purpose the platen 141, is rotatably mounted in the upper ends of platen frame side plates 142 which extend through casing aperture 11 and are secured together by transversely extending stay rods 143, 144 and 145, to form a rocking frame which is mounted upon a transversely extending rock shaft 146 journalled in main frame plates 5 and 6. The platen frame side plates 142 may be secured to or otherwise adapted to be rocked by rocking the shafts 146, but preferably a suitable hub 147 is fixed on the rock shaft 146 and provided with a rock arm 149 having a forked lower end embracing the lowermost platen frame stay rod 145. The side plates 142 of the platen rock frame are provided with forwardly projecting lugs 152 adapted to engage a fixed transverse rod 153 mounted in the main frame plates 5 and 6 for limiting the rearward movement of the platen under the action of a platen frame restoring spring 154 connected at its rear end to the stay rod 145, the other end extending toward the front of the machine and being suitably anchored to one of the fixed transverse rods previously referred to. The platen frame is adapted to be rocked to move the platen forward and downward through aperture 11 against types 70 (corresponding with keys depressed) which are aligned side by side, during forward movement of handle 196, in a common printing plane facing upward and rearward through opening 11. The means for moving the platen against the types is described under the heading "Control mechanisms". Suitable means are provided for feeding a record strip from a paper roll over the front of the platen and holding the strip to move with the platen toward and from the type segments as shown and described in the copending application referred to above, and suitable means is also provided for feeding and guiding an inked ribbon 376 between the platen and the impression plane of the types as more fully shown and described in said application.

Control mechanism

The general operating handle 196, which is adapted to operate the machine for adding after numeral keys have been set in the keyboard, or to operate the machine for taking the total when desired, is preferably provided with a hub 197 removably attached to the end of the main shaft 68 by means of a screw 198 passing through a hole in the hub, the screw being threaded into the end of the main shaft 68. The right-hand end of the main shaft 68 has a hub 199 of a cam disk 201 secured thereto by a pin 200, the outer end of the hub being cut away to form a tongue adapted to cooperate with a transverse slot on the handle hub 197 to ensure the rotation of the shaft 68 when the handle 196 is operated. The cam disk 201 which oscillates with main shaft 68 is provided with an arcuate slot at 202, the ends of which are adapted to cooperate with a laterally projecting stud 203 secured in the main frame side plate 5 to limit the forward and return throw of the handle. Preferably the return stroke of the handle is cushioned by securing a leather pad 204 to the inner face of the cam disk 201 in position to engage the stud 203. The peripheral edge of the cam disk 201 is formed to provide a cam edge portion 205 and a dwell edge portion 215 adapted to cooperate with a friction roller 206 to rock and hold down a rock arm 209. Roller 206 is mounted on the upper end of a lever 207 pivoted at 208 to the rock arm 209 which is secured to the end of the rock shaft 121 upon which the accumulator rocking frame 110 is mounted, as previously described. The forward end 210 of the rock arm 209 is provided with a laterally projecting stud or pin 211 extending inward through a slot 212 in the main frame side plate 5. The inner end of the stud 211 passes through a hole in the forward end of the right-hand side bar 110 of the accumulator rocking frame and is secured to said bar 110 by a nut 213$^a$, thereby tying the accumulator rocking frame to the rock arm 209 so that any movement of the latter will be transmitted to the rocking frame. A spring 214 secured to the stud 211 and to the fixed rear transverse frame rod 91 is adapted to normally lift the accumulator rocking frame and hold the register wheel pinions 108 in mesh with the adding sector racks 107.

By the construction just described, it will be seen that during adding operations when the handle is drawn forward the cam edge portion 205 of cam disk 201 will engage the friction roller 206 and move the rock arm 209 downward, and when the roller passes onto the dwell edge portion 215 of the cam disk the latter will maintain the register wheels out of mesh until the end of the forward stroke of the handle. The friction roller lever 207 is provided with a rearwardly projecting stop lug 216 engaging a pin 217 mounted on the rock arm 209, and a spring 218$^a$, extending from the pin 217 to a pin 218 secured to the lever 207, is adapted to normally hold the friction roller lever in the position shown in Fig. 1, with the lug 216 in contact with the pin 217. It will be seen, however, that the line of thrust of the cam disk through the friction roller 206 and the pivot 208 of the lever 207 at the end of the forward stroke of the handle (Fig. 3) is such that, as soon as the cam disk 201 starts on its return movement as the operating handle starts back, the friction roller 206 will be pushed to the left (as seen in Fig. 4) beyond the line of thrust and, under the action of the spring 214, the accumulator rock frame will be snapped back into normal position and the register pinions 108 will again mesh with the adding sector racks, as shown in Fig. 14. Ordinarily the frictional engagement between the roller 206 and the dwell edge portion 215 of the cam disk is sufficient to ensure tripping of the lever 207 and moving the roller 206 beyond the line of thrust, but in order to make this action certain the dwell edge portion 215 is preferably provided with a notch 219 which will offer sufficient resistance to the friction roller to ensure carrying of the roller beyond the line of thrust to permit the restoration of the register wheels as previously described.

The cam disk 201 is cut away at its upper rear portion to provide a rearwardly projecting arm 220 normally above the main shaft and carrying a friction roller 221 adapted to engage the laterally projecting pin 51 on the trip lever 50 of the bail 46, previously described as being adapted to rock the bail 44 and release the keys by forward movement of the latch strips 28. It will be noted that on the forward stroke of the handle the friction roller 221 will engage the pin 51 and trip the arm 50 of bail 46 without actuating the bail 44 to release the keys, but on the return stroke of the handle the pin 51 will be engaged by the roller 221 and the two bails 46 and 44 will be rocked forwardly together, and the bail 44 will release the set numeral keys. The roller 221 continuing on the return stroke will pass under the pin 51 to the position shown in Fig. 1 of the drawings, thereby permitting the restoration of the bails 44 and 46 under the action of the latch strip springs 43, as previously described.

The cam disk 201 is also utilized for operating the platen rocking frame for moving it toward and from the type segments for taking impressions from types aligned in the printing plane. For this purpose a link or pitman 222 is pivotally mounted on a stud 223 carried by the cam disk 201 and normally located forward of the axis of rotation of the disk and the main or handle shaft 68, as indicated in Fig. 1, the link extending downward and rearward at an angle, such that the cam and link will afford a toggle connection between the handle and a rock arm 227, which connection is substantially on a dead center when the handle is at the forward end of its stroke, as shown in Fig. 3 of the drawings. The rear end of the pitman or link 222 is provided with a laterally inwardly projecting stud 224 secured in place by a lock nut 225. The stud 224 is engaged in a notch 226 in the lower extremity of the crank arm 227 which is secured to the outer end of the platen frame rock shaft 146, the arrangement being such that the link rocks arm 227 rearward during the forward stroke of the handle, and the toggle connection between the handle and crank arm 227 at the end of the forward stroke of the handle forces the platen against the type aligned in the printing plane for pressure-printing of the types on the record strip.

For taking the total without clearing and for taking the total and clearing the machine, special normally idle control means are provided. During normal operation of the machine for addition, the friction roller 206 is adapted to stand in the position shown in Fig. 1 so as to be engaged by the cam 205 to move the register wheels out of engagement with the adding sectors before the adding sectors move and hold them out during the forward stroke of the handle; and when the friction roller lever 207 is tripped on the return stroke of the handle the register wheels will be again brought into mesh with the adding sectors before the adding sectors begin to move to accumulate the number to be added on the return stroke. It will be seen that normally the register wheels are in mesh with the adding sectors, as shown in Fig. 14, and therefore in taking the total all that is necessary is to retain them in this position on the forward stroke of the handle, thereby positioning the respective adding sectors according to the digits representing the total on the register wheels. For this purpose a combined totaling and clearing lever 244 is pivotally mounted on a stud 245 projecting from the right-hand main frame side plate 5. Preferably a double-acting spring 246, extending radially of the pivot stud 245, is connected between a pin 247 on the lever 244 and a fixed pin 248 on the frame plate 5. The spring 246 will hold the totaling and clearing lever 244 in and restore it to the position represented in Fig. 1, which is the normal idle or inoperative position, the lever being adapted for movement both counter-clockwise and clockwise, from normal position, as hereinafter explained. A total-key lever 249 is pivoted on a stud 250 held to the frame plate 5, and is provided with an open slot at 251 engaging a pin 252 projecting from the side of the totaling and clearing lever 244, as indicated in Fig. 1. A finger button 253 is provided for moving the upper end of the total-key lever 249 toward the rear, thereby operating the totaling and clearing lever 244 counter-clockwise. The lower extremity of the totaling and clearing lever 244 is preferably provided with an arm 254 adapted to cooperate with a pin 255 extending inward from the lower end of the friction roller lever 207, previously described as mounted on the rock arm 209 of the accumulator rocking frame. The lever arm 254 is adapted to engage the pin 255 when the total key 253 is moved rearward (see Fig. 24), thereby moving the friction roller 206 out of the field of the cam 205. Thus, when the handle 196 is pulled forward as shown in Fig. 26, after the total key 253 has been operated, the register wheels will remain in mesh with the adding sectors on the forward stroke of the handle and be rotated in clockwise direction as viewed from the right until arrested by the triggers 114 engaging the flat sides of the noses 115 of the carrying levers, thereby locating the type segments to present types at the printing line according to the total represented on the accumulators, as shown in Fig. 25, and the total will be printed when the platen engages the types so positioned at the printing line. It has been previously pointed out that during the return stroke of the handle, in normal addition, the register wheels are thrown into and remain in mesh with the adding sectors, and this will be true after the forward stroke of the handle in the total-taking operation just described. Therefore, the total will remain on the register wheels at the end of the return stroke of the handle, as the adding sectors will drive the accumulator pinions from zero to the positions from which they were returned, thereby giving what is called a sub-total.

In order to take a grand total and clear the register wheels after the total has been obtained and printed, it is necessary to provide means for holding the register wheels out of mesh with the adding sectors on the return stroke of the handle. For this purpose the totaling and clearing lever 244 is adapted to be rocked in the opposite direction, that is clockwise, on the return stroke of the handle. In order to accomplish this a trip lever 256 is pivotally mounted on a stud 257 projecting outward from the side of the frame plate 5, the lever being held normally in the position shown in Fig. 1 by means of a radial double-acting spring 258 connected to the tail of the lever and to the lower end 259 of a clearing key stem 260. The stud 257 is adapted to be engaged by a depending stop-projection 244ª upon the lever 244 to limit the counter-clockwise movement of said lever. The upper part of the clearing key stem 260 is slidably guided to move up and down and rock slightly fore and aft in a slot 260ª in a shelf-like plate 237 held to frame plate 5, while the lower end thereof is preferably pivoted at 261 to the front end of a lever 262 pivotally mounted on the main shaft 68, as shown in Fig. 6 of the drawings, a bridge bracket 263 being secured thereto to provide for a wide bearing on the shaft 68. The rear end of the lever 262 is bent inward at right angles as shown at 264 in Fig. 11, and the end of this portion is bent rearward, parallel to the type segments, and lies adjacent the units segment. This final rear end of the lever is pointed at 265 (see Fig. 1) to form a dash (—) which is adapted to be printed on the paper at the side of the total when the clearing key stem 260 is depressed. The clearing key stem is provided with a notch at 266 adapted to engage the edge of the slot 260ª in plate 237 to thereby hold the key stem in depressed position. A spring 267, extending from the pin 261 to the shelf plate 237, is adapted to restore the key stem 260 to normal position and move the character-carrying lever 262 out of printing position.

A stud 268 projecting from the side of the cam disk 201 is adapted to pass the rear end of the trip lever 256 when the latter is in the position shown in Fig. 1, but when the clearing key stem 260 is depressed as indicated in Fig. 27 the stud 268 will engage the tapering end 269 of the trip lever, on the forward stroke of the handle, and merely push it out of the way. The spring 258, however, will flip the point 269 of the trip lever back into the path of the stud 268 as soon as the latter has passed, so that upon the return stroke of the handle, as shown in Fig. 29, the stud 268 will engage the other side of the lever 256 and swing it up into engagement with a pin or stud 270 projecting from the total clearing lever 244 and, as the handle continues on the return stroke, the totaling and clearing lever 244 will be moved clockwise as viewed in Fig. 29. The lower extremity of the totaling and clearing lever 244 is provided with a cam surface at 271, adapted to engage the stud 211 and move the accumulator rocking frame downward to disengage the register wheels from the adding sectors, as shown in Fig. 29, so that during the return stroke of the handle the register wheels will not be rotated. It thus will be seen that by combining the operation of the total key 253 and the clearing key 260, the register wheels will remain in mesh with the adding sectors during the forward stroke of the handle so as to turn all of the register wheels back to zero and print the total, but upon the return stroke of the handle the trip lever 256 will come into action and, by withdrawing the register wheels from the adding sectors, the clearing operation is effected, leaving the register wheels in zero position.

One novel feature in connection with this mechanism is that if the clearing key stem 260 alone is depressed during a normal operation of the machine the trip lever 256 will come into action, as previously described, and the accumulator rocking frame will be moved downward to disengage the register wheels from the adding sectors on the return stroke of the handle, so that the number set up in the keyboard will be printed but not added or accumulated on the register wheels. Thus in the clearing key, and without any additional mechanism, I have provided a "non-add" key which may be used as such when required.

The upper extremity of the totaling and clearing lever 244 is provided with a cam edge at 272 adapted to engage a stud 67, projecting from the bail 44, when total-key lever 249 is operated, so that the bail 44 will be moved toward the front of the machine thereby forcing forward the latch strips 28 to cause said strips to perform the necessary operation of lifting the stop levers 37 from in front of all the detents 71 so that all of the adding or accumulator driving units are free to move under the pull of springs 74 on the forward stroke of the handle. The cam edge 272 is brought into operation when the total key 253 is moved rearward to set the machine for taking a total, as indicated in Fig. 24 of the drawings.

The totaling and clearing lever 244 is preferably provided with two studs or pins 273 and 274, spaced apart as indicated by dotted lines in Fig. 1, so that when the handle is operated an arcuate locking plate 275, secured to the inside face of the cam plate 201, will pass between the pins and prevent operation of the totaling and clearing lever 244. By this mechanism mal-operation of the total key is avoided. The pins 273 and 274 are of such diameter that when the total key 253 is depressed, as shown in Fig. 24, the pin 273 will ride on the inner face of the locking plate 275 and prevent restoration of the total key until the end of the forward stroke of the handle, when its function is completed. If, as previously pointed out, the clearing key 260 also has been depressed, as shown in Fig. 27, then the totaling and clearing lever 244 will be rocked clockwise on the return stroke of the handle, by the stud 268, and the locking pin 274 will ride on the outer face of the locking plate 275 as indicated in Fig. 29, thereby holding the totaling and clearing lever 244 in rocked position, after positioning thereof by trip lever 256, so as to prevent reengagement of the register wheels with the adding sectors until the end of the return stroke of the handle. It will be noted that the locking plate 275 enters behind the pin 274 just before the stud 268 passes off the tip 269 of the trip lever 256.

The totaling and clearing lever 244 is provided with a forwardly projecting arm 276 from which a pin 277 extends outward, as indicated in Figs. 27 and 29, the pin being adapted to engage the stem of the clearing key 260 when the totaling and clearing lever 244 is rocked clockwise, as will be the case when the key 260 is depressed, to thereby release the notch 266 from plate 237 and permit the key 260 to be restored to normal position by its spring 267, as indicated in Fig. 29.

The totaling and clearing lever 244 is also provided with a depending finger 106 which, as shown in Fig. 27, is adapted, when the total key 253 is operated, to pass over, that is, clear, the ear 105 on the upper end of the arm 104, previously referred to as carried by the universal bail 101, which lies in rear of the lugs 97 of the adding sector links 84, as will be seen in Figs. 1 and 27. If, however, any of the adding sectors have been permitted to move the extra unit space for transfer of the tens, that is clockwise as viewed in Fig. 1 of the drawings, the bail 101 will be moved rearward to bring the ear 105 into the path of the finger 106, thereby preventing operation of the total key 253 until an idle stroke of the handle has restored the adding sectors and links 84 to normal position. By this means the taking of an erroneous total is prevented.

The control mechanisms thus far described are located or operated from the right-hand side of the machine, and the control mechanism located on the left-hand side of the machine will be now described. As will be seen in Fig. 2, the left-hand end of the main shaft 68 is provided with a segmental cam plate 279 provided with a hub 280 secured to the shaft 68 by a pin 281. The cam plate 279 is provided with a cam slot 282 of irregular-shape, extending from the outer periphery where it is provided with a dwell at 283, inward toward the axis of the shaft 68 where it is provided with a dwell at 284. The cam slot 282 is adapted to cooperate with a roller 285 mounted on the forward end of a crank arm 286 extending forward from a stub shaft 287. The latter is rotatably mounted in a bearing boss 288 (see Fig. 11) secured to and projecting inward from the main frame plate 6. The crank arm 286 is preferably provided with an inwardly projecting stud 289, indicated just below the roller in Fig. 11, which projects through an arcuate slot 290 in the frame side plate 6. A pair of connecting links 291 are pivotally connected at their forward ends with the end of the stud 289, as indicated in Figs. 7 and 10, the links extending rearward from said stud and having their rear ends pivotally connected to a stud 292 carried by and projecting from an arm 293 forming part of a universal restoring bail 294 for the accumulator driving units. The restoring bail 294 is rotatably mounted on the main shaft 68 and is normally located in front of the main shaft in position to cooperate with noses or stop edges 295 formed on the type segments 69 which, as previously pointed out, form the driver elements of the adding or accumulator actuating units. When the handle is operated the cam roller 285 will be moved upward toward the center of the shaft 68 by following the cam slot 282, as indicated in Figs. 7 to 9, thereby moving the universal restoring bail 294 counterclockwise as viewed from the right-hand side of the machine. This will permit the adding sectors to move counter-clockwise as viewed from the right, differentially, according to the number set up on the keyboard, and when the handle returns the bail 294 will pick up the noses 295 of the type segments and restore the type segments to normal position against the action of their springs 74 and restore the adding sectors through the movement of the type segments.

It will be understood that the throw of the universal bail 294 should be accurately determined, for, on the forward stroke of the handle, the bail should move far enough to permit the adding unit driving elements 69 to move the adding sectors 79 the full nine units or spaces and also, upon its return movement, to bring the driving elements back far enough for the key-actuated stop levers 37 to drop in behind the stop noses 71 with the cipher types one space below the printing line and tension the transfer springs 82. In order to ensure accurate adjustment of the positions of the bail 294, both in its normal (return throw) position and at the end of its rearward throw, the two links 291 are preferably employed, which, in the present instance, are made L-shaped as indicated in Fig. 10, so that the short arms thereof may be bent forward or backward to vary the distance, between the centers 289 and 292. To facilitate the adjustment the holes in one end of the links 291 are elongated substantially as indicated at 296. It thus will be seen that one link 291 may be bent to determine the location of the universal bail 294 in its normal position, and the other bent so as to determine the location of the bail at the end of its rearward throw.
This is an important feature of my improvement, for it eliminates and does not require accurate manufacturing operations. An accurate limit for the rearward throw of the bail 294 is desirable, for the bail, which moves in arcuate slots 79ª back of the racks 107, is adapted to engage the adding sectors 79 at the bottom of these slots (Fig. 16) and restore them to normal position, if any of them have been moved forward, as indicated in Fig. 21, for transfer of the tens. This accurate positioning of the adding sectors 79 is required in order to move the fingers 120 at the lower extremities thereof back far enough to permit the ears 119 on the carrying levers 116 to drop down in front of the fingers when the carrying levers are released and restored to normal position, as indicated in Fig. 16.

In order to ensure the full rearward throw of the bail 294, to move the adding sectors 79 the full predetermined limit, as just described, it has been found desirable to provide a positive driving member moving with shaft 68 for moving the bail rearward slightly, if necessary, at the end of the forward stroke of the handle. This driving member preferably comprises a thin sheet metal spiral finger 297 carried by a hub 298 which is secured, by means of a pin 299 (see Fig. 11), to the main handle shaft 68, the end of the finger 297 being adapted, at the end of the forward stroke of the handle, to engage the stud 292 substantially as shown in Fig. 10 and positively move the bail 294 rearward the full limit required. The spiral arrangement of the finger 297 provides for a resilient engagement between the finger and the stud 292 so as to avoid injury to the parts, particularly as a positive stop is provided for limiting the rearward throw of the bail 294. This positive stop for limiting the rearward throw of the bail 294 comprises a finger 300 extending radially (see Fig. 10) of an arm 301 rotatable with the bail upon the main shaft 68 and having its opposite end mounted upon the stud 292, previously referred to as extending laterally from the arm 293 of the bail 294. In this manner the stop arm 300 is movable with the bail and is adapted to limit its movement on the forward stroke of the handle by engaging a fixed stay rod, preferably the rearmost of the rods 91 which, as previously pointed out, support the stop slides 86 of the adding sectors (see Fig. 16). The arm 301 is preferably bifurcated and provided with a second radially projecting finger 302 which carries the laterally projecting stud or pin 63 (see Fig. 10) adapted to engage the depending arm 62 of a locking bail 60, for holding the latter out of engagement with the notches 59 in the key latch strips 28. It thus will be seen that when the handle is operated on the forward stroke the pin 63 will move out of the field of the rock arm 62, thus permitting the locking bail 60 to drop into the notches 59, as indicated in Fig. 16, to lock the latch strips against accidental unlocking and return to normal position, and the stop finger 300 will engage the transverse rod 91 to limit the rearward throw of the restoring bail 294, the restoring bail being positively moved to its ultimate rearward throw by means of the resilient finger 297, as shown in Fig. 10.

For returning the general operating handle, the cam plate 279 is preferably provided with a laterally projecting stud 308 (see Fig. 2), to the outer end of which a cord or cable 309 is secured by means of an anchor tip 310 pivotally held on the stud and secured to the end of the cable, substantially as indicated in Fig. 2. The cable extends toward the rear of the machine from stud 308 where it passes over a pulley 311 rotatably mounted on a stud 312 projecting laterally from the main side frame plate 6. The cable extends forward from pulley 311 and is provided at its forward end with an anchor tip 313 which is secured to the rear end of a helical spring 314, the front end of which is secured to a stud 315 projecting laterally outward from the main frame side plate 6 near the front end of the machine. It will be seen that by this means I am enabled to use a long helical spring which will give a substantially uniform pull on the handle mechanism to return the handle and associated parts to normal position after the forward stroke of the handle. It is obvious, however, that in my improved construction, where the stroke of the handle is approximately 135°, the pull of the cord or cable 309 at the end of the forward stroke of the handle, as shown in Fig. 9, would be so nearly on the line of dead center that it might be ineffective in properly returning the parts to normal position. Therefore to equalize the pull a notched stud 316 is preferably mounted on the cam disk 279, at approximately 135° from the pin 308, in order to pick up the cord or cable 309 and thereby change the leverage so that the pull of the spring at the beginning of the return stroke of the handle will be more effective and at a suitable radius from the center of the main shaft 68.

Printing of zeros

When the zero keys are depressed, the stop fingers 21 thereof are in position to block any movement of the stop slides 86 and the adding sectors on the forward stroke of the handle. The stop levers 37 of the key rows in which zero keys are depressed will be rocked to lift their detent ears 72 out of the path of stop fingers 71 on their associated type segments 69 and the type segments will be moved one space by the springs 82 and 74 in counterclockwise direction as viewed from the right to bring the zero types on said type segments into the printing line. This counterclockwise movement of a type segment relatively to its connected adding sector is permitted by the pin-and-slot connections 80—81 between the type segments and the adding sectors 79 and takes place when the handle is rocked forward in the usual manner for the adding and printing operation.

However, I have provided for printing the zeros in the units and tens places, which are ordinarily allotted to cents, and for this reason the zeros in these denominations preferably should be printed. By thus providing for printing the zeros in the cents column the zeros in these denominations will be printed at every stroke of the handle, if no numeral keys are depressed, and this means is utilized for indicating an idle stroke of the handle by printing two zeros on the strip of paper. The printing of the zeros in the units and tens or cents columns is provided for in my machine by cutting the stop edges of the lugs 71, on the units and tens driving elements 69, back by means of notches 327, as indicated in Figs. 24 and 25, thereby permitting the units and tens type segments to advance a unit distance each time the handle is operated, without depression of the cipher or zero keys of these decimal order key rows, before engaging the ears 72 on the ends of the stop levers 37. This advance movement of the type segments 69—70, independently of the adding sectors 79, will be permitted by the pin-and-slot connections therebetween and will be effected under the opposing action of the driving springs 74 and the transfer springs 82 on the type segments and adding sectors, which latter springs 82, as previously pointed out, normally tend to move the adding sectors 79 clockwise the unit space required for transfer of the tens, while driving springs 74 normally tend to move the type segments 69 counterclockwise upon release of the segments by rearward movement of bail 294.

It will be understood that the units adding sector 79 is never required to effect the transfer of the tens and for all practical purposes the spring 82 could be eliminated from the units adding unit. Furthermore, it will be seen that no carrying lever 116 is provided for the units adding sector. Preferably, for this reason, the rock shaft 121 is provided with a dead end notch 328 for engaging the nose 120 of the units adding sector, substantially as indicated in Fig. 11 of the drawings.

Operation

The operation of the various parts has been indicated in the description thereof, but it will be desirable to review briefly the general operation of the machine.

*Addition:* In normal addition on the machine, keys 18 are depressed in the keyboard according to the digits in the different denominations and, if zeros appear in the number and it is desired that they should be printed on the list, the corresponding zero keys should be depressed. Depression of a selected numeral key in each selected decimal order or denominational key row will move the latch strips 28 associated with said key rows forward until the latch hooks 29 engage over detents 30 of the depressed key stems by reason of partial return movement of the latch strips. Detents 30 prevent full return of the latch strips thereby holding the associated stop levers 37 out of the paths of the detent lugs 71 of the respective adding units, said stop levers being lifted by forward movement of the latch strips and held in inoperative position as long as the keys are locked down. The keyboard is a "flexible" keyboard and, therefore, if a numeral key has been wrongly depressed in any column the mere depression of the proper numeral key will automatically release the wrongly depressed key, so that under the action of its spring 33 it will be restored to normal position.

After the number has been set up on the keyboard, as described, the handle 196 is drawn forward its full stroke, thereby rotating the main handle shaft 68 and the associated control cams. The first effect of drawing forward the handle, for normal addition, is that the cam edge portion 205 of the cam disk 201 will ride over the friction roller 206 and move the accumulator rocking frame to its lowermost position in which register wheel pinions 108 are out of mesh with the adding sector racks 107. Thereafter the dwell edge portion 215 of cam disk 201 rides over the roller 106 to hold the accumulator frame down throughout the rest of the forward stroke of the handle, as shown in Fig. 3. Bail 294 begins to swing rearward, after the pinions 108 are demeshed, by reason of dwell 283 of cam disk 279 passing off roller 285 and roller 285 being drawn upward and rearward by the cam portion 282. The operating connection between roller 285 and bail 294 continues to drive the bail rearward until shortly before the end of the forward stroke of the handle when the roller enters the dwell portion 284 of the slot in cam disk 279 and ceases to drive the bail. The rearward movement of the bail permits the differential movement of the respective accumulator driving or adding units released by actuated stop levers 37 according to the keys depressed. In this movement of the active accumulator driving units under the pull of the driving springs 74, the stop slides 86 will move forward until the proper ones of the stops 87—95—96 thereon engage the lower or tail ends 20—21 of the cooperating set keys, to thereby position the type segments and adding sectors to correspond with the number set up in the keyboard. During this operation of bail 294 the driving springs 74 are operative to move all the elements of the active adding units, and the transfer springs 82 are operative to cause a relative movement between the driving elements or type segments 69 and the adding sectors 79 of the active units, to the extent of the unit space permitted by the pin-and-slot connection 80—81. At the end of the forward stroke of handle 196, as shown in Figs. 3 and 16, the platen will be brought into printing engagement with types 70 (aligned at the printing line by movements of the active type segments 69) by reason of the toggle action of disk 201 and link or pitman 222 which, through the crank arm 227, rocks the platen rocking frame 142, as previously described.

On the forward stroke of the handle the bail 294 is moved rearward, in timed relation with the handle movement as described, by means of the cam slot in the cam 279 on the left side of the machine, engaging the roller 285 as shown in Figs. 7 and 8 and moving the crank arm 286 upward and rearward. The arm 286, through the links 291, will rock the bail from the position indicated in Fig. 7 to that shown in Fig. 8 and, at the end of the forward stroke of the handle, the resilient finger 297 driven positively by shaft 68, by engaging the stud 292, will positively position the bail 294 at the limit of its rearward movement, as determined by the engagement of the stop finger 300 with the rod 91. During the final rearward movement of the bail any of the adding sectors 79 that may have been left in the position shown in Fig. 21 after transfer of the tens on a preceding operation of the machine will be moved counter-clockwise as viewed from the right, into normal position, as shown in Fig. 16, so that the ears 119 of the carrying levers 116 may drop down in front of the detent fingers 120, thus restoring the transfer mechanism for the next transfer of the tens.

After the handle 196 has been drawn forward its full stroke it is released and will be snapped back to normal position by spring 314. Upon the return stroke of the handle the cam disk 201 first moves the friction roller lever 207 over to the left as shown in Fig. 4, thereby permitting the accumulator rocking frame to snap back to normal position under the action of its lifting spring 214. This places the register wheel pinions 108 again in mesh with the adding sector racks 107 for accumulation of the set-up number into the total. The bail 294 remains idle during remeshing of the pinions and racks, by the return movement of the cam plate 279 from the position shown in Fig. 9 to that shown in Fig. 8, and will be restored to normal position as roller 285 passes over the active cam portion 282 of the slot in cam 279, thereby engaging noses 295 of the type segments 69 and restoring the active adding units to normal position as shown in Fig. 14, except in the rows where adding sectors are released for transfer of tens. In the latter rows the adding units will return to the position shown in Fig. 21. On the return stroke of the handle the roller 221 on the cam disk 201 will, near the end of the stroke, engage the pin 51 as indicated in Fig. 5 and rock the universal bail 44 forward to move the latch strips 28 and release any keys set in the keyboard.

The transfer of the tens on the return stroke of the handle is effected by the triggers 114 engaging the noses 115 (see Fig. 23) of the carrying levers 116 to the left of the respective register wheels accumulating more than nine and moving them down to the position shown in Fig. 21, thereby lifting the ears 119 out of the field of the corresponding detent fingers 120. If the adding unit to the left is in normal position, that is no number has been set up in that column of keys, the spring 82 will immediately move the adding sector 79 to the position shown in Fig. 21, thereby moving the corresponding register wheel an additional unit distance for the transfer of the tens. If, however, the corresponding adding unit has been advanced as indicated in Fig. 16, it will be necessary to hold the carrying lever 116 in its actuated position until the corresponding adding unit has been returned to normal position, to thereby permit the adding sector 79 to assume the transfer position shown in Fig. 21. For this purpose the latch pawls 127 are provided for latching the carrying levers 116 in actuated position and will retain them in this position until the next forward operation of the handle. On the succeeding forward operation of the handle the accumulator rocking frame is again withdrawn from cooperation with the adding sectors and the latches 127 will be lifted to release the carrying levers, by engagement of the latch pawls with the fixed bar or rod 133, substantially as shown in Fig. 16.

*Sub-total:* For securing a sub-total the total key 253 is moved rearward as indicated in Fig. 24 of the drawings, and held in this position while starting the operating handle forward; but it will be remembered that the total should not be taken until after an idle stroke of the handle for, as previously pointed out, if any of the adding sectors 79 are in the position shown in Fig. 21, which they will occupy after the transfer of the tens, the ear 105 on the bail 101 will be moved rearward into the path of the depending finger 278, thereby preventing operation of the total key 253. However, by an idle stroke of the handle the adding sectors 79 will be restored to the position shown in Fig. 22, to avoid any error in taking the total. When the total key is depressed, as shown in Fig. 24, the edge 272 on the total clearing lever 244 will engage the stud 67 and by rocking the bail 44 will release any set numeral keys and lift all the stop levers 37 so that all the adding units are free to be moved by their actuating springs when the handle is pulled forward. At the same time the finger 254 at the lower extremity of the totaling and clearing lever 244 will engage the pin 255 and move the friction roller 206 on the lever 207 out of the path of the cam edge portion 205 of cam disk 201, so that when the cam disk 201 is rotated counterclockwise as viewed from the right by the forward stroke of the handle, the register wheel pinions 108 will remain in mesh with the adding sector racks 107 so as to rotate the register wheels backward, or clockwise as viewed from the right, until, as shown in Fig. 25, the triggers 114 engage the flat faces of the noses 115 of the carrying levers 116, when all the register wheels will stand at zero. At the same time the printing segments 69 will be positioned to present types 70 at the printing line according to the total accumulated in the register wheels and, at the end of the forward stroke of the handle, the platen will be forced against the positioned type to print the total. Upon the return stroke of the handle the register wheels will remain in engagement with the adding sectors and hence the register wheels will be rotated forward or counterclockwise as viewed from the right, in the same manner as for addition, thus restoring the total previously accumulated in the accumulator, after printing the sub-total.

*Clearing:* In order to clear the accumulator the clearing key 260 is depressed and latched down as shown in Fig. 27, and the total key 253 is pushed backward. Under these conditions, the operation of the mechanism on the forward stroke of the handle will be identical with that just described in connection with taking the sub-total, but, with the clearing key 260 depressed, the trip lever 256 will be engaged by the pin 268 on cam disk 201 at the beginning of the return stroke of the handle and, as shown in Fig. 29, the totaling and clearing lever 244 will be then moved clockwise by engagement of the lever 256 with the stud 270. This clockwise movement of the totaling and clearing lever 244 will force the cam edge 271 thereof against the stud 211 and thereby depress the accumulator rocking frame to move the register wheels out of engagement with the adding sectors, as indicated in Fig. 30, before bail 294 begins to return units that have traveled their maximum throw. Since the register wheels are withdrawn, while the triggers 114 are in zero position, that is in contact with the flat sides of the noses 115 of the carrying levers, the register wheels are cleared after printing the grand total.

When the totaling and clearing lever 244 is rocked clockwise by the trip lever 256 the stud 277 is brought into engagement with the key 260, as shown in Fig. 29, and the latter is moved rearward slightly to release the notch 266 and permit the restoration of the key to normal position by its spring 267. As previously pointed out, the depression of clearing key 260 will move the lever 262 so that the character printing end 265 thereof will be brought into the printing line of the types 70 representing the total and print a dash following the total, thus indicating on the strip of paper that the clearing operation has been performed. When the total key 253 is operated either for the sub-total or the clearing operation the cam edge 272 at the upper extremity of the totaling and clearing lever 244 will engage the pin 67 and rock the bail 44 forward to release any keys that may be set in the keyboard, and obviously this will prevent the setting of any keys during the forward stroke of the handle, for the totaling and clearing lever 244 will be held in set position until the end of the handle stroke, as shown in Fig. 27, by the locking pin 273 riding on the inner face of the locking plate 275, when it will be released. On the return stroke of the handle in the clearing operation, as shown in Fig. 29, the totaling and clearing lever 244 will be rocked as above described and held in rocked position, as shown, by engagement of the pin 274 with the outer face of the locking plate 275 until the end of the return stroke of the handle, when it will be released.

*Non-add:* In my improved machine no special non-add key is required, for if the clearing key 260 is depressed after a number has been set up on the keyboard without setting the total key, then, on the forward stroke of the handle, the machine will operate in the same manner as in adding operations but, on the return stroke of the handle, the trip lever 256 will be brought into operation to move the totaling and clearing lever 244 clockwise, that is the same as described for the clearing operation, with the result that the accumulator frame is moved downward to withdraw the register wheels from the adding sectors and hold them out during the return stroke of the handle, thereby preventing the accumulation of the number set up on the keyboard. The number, however, will have been printed in the usual manner unless the non-print key, described in the copending application referred to, has been depressed.

What I claim is:—

1. In a key set adding machine having an adding sector and a type segment, the combination of an accumulator unit movable toward and from the adding sector and provided with a register wheel for cooperation with the adding sector, a transfer lever mounted upon and movable bodily with said accumulator unit for cooperation with the adding sector to prevent unit space movement thereof except when said lever is actuated for transfer of tens, and a depending transfer lug formed on the adding sector extending into the path of one end of the cooperating transfer lever.

2. In a key-set adding machine, the combination with an accumulator unit pivotally mounted in the frame of the machine, of a rod forming the pivot of said accumulator unit, said rod being provided with a transverse slot extending approximately to the center of the rod, a transfer lever pivotally supported in said accumulator unit, the tail end of said lever extending into the said slot in said rod, and an adding sector provided with a depending transfer lug extending into the said slot in said rod for cooperation with said transfer lever.

3. In a key-set adding machine, the combination with an accumulator unit pivotally mounted in the frame of the machine, of a rod forming the pivot of said accumulator unit, said rod being provided with a transverse slot extending approximately to the center of the rod, a transfer lever pivotally supported in said accumulator unit, the tail end of said lever extending into the said slot in said rod, and an adding sector provided with a depending transfer lug extending into the said slot in said rod for cooperation with said transfer lever; a register wheel rotatably mounted in said accumulator unit and provided with a trigger for actuating the said transfer lever, the arrangement being such that the pivotal relation between said trigger and the transfer lever is not changed by movement of the accumulator unit on said pivot rod.

4. In a calculating machine, a main frame; an accumulator frame pivotally mounted in the main frame; an accumulator pinion in said shifting frame; a transfer-control member pivotally mounted on said shifting frame and having a stop portion normally located adjacent the pivotal axis of said frame in position to engage an adding sector irrespective of the position of said frame to limit movement of said sector in adding direction; a transfer trip rotatable with the pinion, a latch pivoted on the shifting frame to swing into and out of interlocked relation with the transfer control member; a spring connecting the latch with its associated control member, and stationary means on the main frame engageable by the latch during pinion-demeshing movement of the shifting frame.

5. In a calculating machine, a main frame; an accumulator frame pivotally mounted in the main frame; an accumulator pinion in said shifting frame; and a transfer-control member pivotally mounted on said shifting frame and having a stop portion normally located adjacent the pivotal axis of said frame in position to engage an adding sector irrespective of the position of said frame to limit movement of said sector in adding direction.

6. In a calculating machine, a main frame; an accumulator frame pivotally mounted in the main frame; an accumulator pinion in said shifting frame; a transfer-control member pivotally mounted on said shifting frame and having a stop portion normally located adjacent the pivotal axis of said frame in position to engage a stop lug on an adding sector irrespective of the position of said frame to limit movement of said sector in adding direction; a transfer trip rotatable with the pinion; a latch pivoted on the shifting frame to swing into and out of interlocked relation with the transfer control member; a spring connecting the latch with its associated control member, and stationary means on the main frame engageable by the latch during pinion-demeshing movement of the shifting frame.

7. In a key set adding machine, the combination with an adding sector of an accumulator unit mounted in the frame of the machine to swing downwardly from the adding sector; a pair of register wheels one of lower order and one the next higher order rotatably mounted in said accumulator unit, the higher order wheel being arranged for cooperation with said adding sector and movable downwardly out of cooperation therewith by pivotal movement of said accumulator unit; a transfer lever pivotally mounted in said accumulator unit; a depending transfer lug formed on the adding sector and arranged for coaction with one end of its cooperating transfer lever; a trigger carried by the register wheel of lower order for actuating said transfer lever to release the adding sector cooperating with the accumulator wheel of higher order; and a latch pawl pivotally mounted in said accumulator unit for cooperation with said transfer lever for holding the lever against return movement after actuation by said trigger.

8. In a key set adding machine, the combination with an adding sector of an accumulator unit mounted in the frame of the machine to swing downwardly from the adding sector; a rod forming the pivot of said accumulator unit, said rod being provided with a transverse slot extending approximately to the center of the rod; a pair of register wheels one of lower order and one of higher order rotatably mounted in said accumulator unit, the higher order wheel being arranged for cooperation with said adding sector and movable downwardly out of cooperation therewith by pivotal movement of said accumulator unit; a transfer lever pivotally mounted in said accumulator unit, the tail end of said lever extending into said slot of said rod and said transfer lever being formed with a depending locking arm; a depending transfer lug formed on the adding sector and arranged to extend into said slot of said rod for coaction with one end of its cooperating transfer lever; a trigger carried by the register wheel of lower order for actuating said transfer lever to release the adding sector cooperating with the accumulator wheel of higher order; and a latch pawl pivotally mounted in said accumulator unit for cooperation with said depending locking arm of the transfer lever for holding the lever against return movement after actuation by said trigger.

9. In a key set adding machine, the combination with an adding sector of an accumulator unit mounted in the frame of the machine; a rod forming the pivot of said accumulator unit, said rod being provided with a transverse slot extending approximately to the center of the rod; a pair of register wheels one of lower order and one of higher order rotatably mounted in said accumulator unit, the higher order wheel being arranged for cooperation with said adding sector and movable downwardly out of cooperation therewith by pivotal movement of said accumulator unit; a transfer lever pivotally mounted in said accumulator unit, the tail end of said lever extending into said slot of said rod, said transfer lever being formed with a depending locking arm; a depending transfer lug formed on the adding sector and arranged to extend into said slot of said rod; a trigger carried by the register wheel of lower order for actuating said transfer lever to release the adding sector cooperating with the accumulator wheel of higher order; and a latch pawl pivotally mounted in said accumulator unit for cooperation with the depending locking arm of said transfer lever.

10. In a key-set adding machine, the combination with a main shaft, of an adding sector and a type segment rotatably mounted as a pair on said main shaft the adding sector being formed with an arcuate slot; pin-and-slot connections between the sector and segment and permitting relative movement therebetween to the extent of a unit space; a transfer spring connecting together the sector and segment; a radial lug on the type segment; a universal bail mounted on the main shaft, one member thereof extending parallel with the main shaft through the arcuate slot of the adding sector and normally engaging said radial lug and holding the sector and segment in normal position against rotation and adapted to engage the bottom of said arcuate slot to return the adding sector to normal on the rearward throw of said bail; a handle connected to the main shaft; and means operated on the forward stroke of the handle to move the universal bail rearward to free the sector and segment and operated on the return stroke of the handle to move the bail forward to restore the sector and segment to normal position and to move the type segment relative to the adding sector the extent of said pin-and-slot connection to place the transfer spring under tension.

11. In a key-set adding machine, the combination with a shaft, of an adding and printing unit mounted thereon and comprising a sheet metal type-carrying disc and a sheet metal disc carrying a rack sector and formed with an arcuate slot, the two discs being arranged side by side and rotatably supported for rotation together and for relative rotation with respect to each other in either direction; a depending detent finger formed on the lower portion of the rack disc; an upwardly extending stop lug on the upper portion of the type-carrying disc adapted to engage a key-controlled stop; pin-and-slot connections between said discs on opposite sides of the shaft to hold them together while permitting a limited relative rotation between them in either direction; a transfer spring connecting the type-carrying disc to the rack sector disc to effect relative movement of said discs in opposite directions; a transfer lever adapted to engage the detent finger on the rack sector disc; means operating on the return stroke of the handle to move the transfer lever to release the rack sector disc; and a universal bail mounted on the said shaft and extending through the arcuate slot of the rack sector and adapted to engage the bottom of the said slot on the rearward stroke of the said bail to restore the rack sector to normal position.

In testimony whereof I hereunto affix my signature.

GLENN J. BARRETT.